United States Patent
Doerksen et al.

(10) Patent No.: US 11,052,942 B2
(45) Date of Patent: Jul. 6, 2021

(54) THREE-WHEELED TILTING VEHICLE

(71) Applicant: Sway Motorsports LLC, Soquel, CA (US)

(72) Inventors: Kyle Jonathan Doerksen, Santa Cruz, CA (US); Joseph Wilcox, Palo Alto, CA (US)

(73) Assignee: Sway Motorsports LLC, Soquel, CA (US)

( * ) Notice: Subject to any disclaimer, the term of this patent is extended or adjusted under 35 U.S.C. 154(b) by 0 days.

(21) Appl. No.: 16/799,800

(22) Filed: Feb. 24, 2020

(65) Prior Publication Data
US 2020/0269916 A1 Aug. 27, 2020

Related U.S. Application Data

(60) Provisional application No. 62/809,482, filed on Feb. 22, 2019, provisional application No. 62/812,918, filed on Mar. 1, 2019.

(51) Int. Cl.
*B62D 9/02* (2006.01)
*B62D 6/00* (2006.01)
*B62D 1/183* (2006.01)
*B62D 9/04* (2006.01)

(52) U.S. Cl.
CPC .............. *B62D 9/02* (2013.01); *B62D 1/183* (2013.01); *B62D 6/00* (2013.01); *B62D 9/04* (2013.01)

(58) Field of Classification Search
CPC ... B62D 9/04; B62D 9/02; B62D 6/00; B62K 5/027; B62K 5/06; B62K 5/10; B62K 21/18
See application file for complete search history.

(56) References Cited

U.S. PATENT DOCUMENTS

| | | |
|---|---|---|
| 1,093,131 A | 4/1914 | Hays |
| 2,081,045 A | 5/1937 | Frederick |
| 2,135,152 A | 11/1938 | Simmonds |
| 2,155,521 A | 4/1939 | Raphael |

(Continued)

FOREIGN PATENT DOCUMENTS

| | | | |
|---|---|---|---|
| JP | 2013-107581 A | 6/2013 | |
| WO | WO-2005025972 A1 * | 3/2005 | ............ B62K 15/00 |
| WO | 2014/145878 A1 | 9/2014 | |

OTHER PUBLICATIONS

Kurt Sigl, Multi-Functional, Single-Seater, Motorised Golf Cart and Golf Caddy, Mar. 24, 2005, EPO, WO 2005-025972 A1, English Abstract (Year: 2005).*

(Continued)

*Primary Examiner* — James A English
(74) *Attorney, Agent, or Firm* — Kolitch Romano LLP

(57) ABSTRACT

A tiltable vehicle is configured to transform between an autonomous mode and a rideable mode by pivoting the handlebars and steering column of the vehicle about a pitch axis. In the autonomous mode, the steering column is folded back toward the chassis and a tiltable chassis of the vehicle is prevented from tilting. In the rideable mode, the steering column is unfolded and the chassis is free to tilt. In some examples, a tiltable vehicle includes features beneficial for vehicle-sharing, such as parking devices or a basket. These features may be included on any suitable vehicle and are not limited to use on transforming vehicles.

20 Claims, 22 Drawing Sheets

(56) References Cited

U.S. PATENT DOCUMENTS

| | | | |
|---|---|---|---|
| 3,137,513 A | 6/1964 | Andre | |
| 3,561,778 A | 2/1971 | La Brie | |
| 3,572,456 A | 3/1971 | Healy | |
| 3,964,563 A | 6/1976 | Allen | |
| 4,020,914 A | 5/1977 | Trautwein | |
| 4,088,199 A | 5/1978 | Trautwein | |
| 4,145,072 A | 3/1979 | Matschinsky | |
| 4,325,565 A | 4/1982 | Winchell | |
| 4,469,344 A | 9/1984 | Coil | |
| 4,546,997 A | 10/1985 | Smyers | |
| 4,662,467 A | 5/1987 | Arai | |
| 4,685,690 A | 8/1987 | Fujita | |
| 4,705,292 A | 11/1987 | Hespelt | |
| 4,740,004 A | 4/1988 | McMullen | |
| 4,878,688 A | 11/1989 | Kubo | |
| 4,887,829 A | 12/1989 | Prince | |
| 5,040,812 A | 8/1991 | Patin | |
| 5,123,351 A | 6/1992 | Guaraldi | |
| 5,405,162 A | 4/1995 | Chin | |
| 5,496,055 A | 3/1996 | Shibahata | |
| 5,597,171 A | 1/1997 | Lee | |
| 5,613,572 A | 3/1997 | Moedinger | |
| 5,697,633 A | 12/1997 | Lee | |
| 5,762,351 A | 6/1998 | Soohoo | |
| 5,765,846 A | 6/1998 | Braun | |
| 6,000,706 A | 12/1999 | Boberg | |
| 6,022,036 A | 2/2000 | Chartrand | |
| 6,027,130 A | 2/2000 | Kawabe | |
| 6,203,043 B1 | 3/2001 | Lehman | |
| 6,250,649 B1 | 6/2001 | Braun | |
| 6,305,700 B1 | 10/2001 | Bruehl | |
| 6,328,125 B1 | 12/2001 | Van Den Brink | |
| 6,382,646 B1 | 5/2002 | Shaw | |
| 6,736,905 B2 | 5/2004 | Smith | |
| 6,763,905 B2 | 7/2004 | Cocco | |
| 7,048,286 B2 | 5/2006 | Eppelein | |
| 7,108,097 B1 | 9/2006 | Bolton | |
| 7,172,045 B2 | 2/2007 | Takayanagi | |
| 7,438,346 B1 | 10/2008 | Breed | |
| 7,467,802 B2 | 12/2008 | Peng | |
| 7,487,985 B1 | 2/2009 | Mighell | |
| 7,530,419 B2 | 5/2009 | Brudeli | |
| 7,591,337 B2 | 9/2009 | Suhre | |
| 7,631,721 B2 | 12/2009 | Hobbs | |
| 7,665,749 B2 | 2/2010 | Wilcox | |
| 7,850,180 B2 | 12/2010 | Wilcox | |
| 9,555,849 B1 | 1/2017 | Abbott | |
| 2006/0017240 A1 | 1/2006 | Laurent | |
| 2006/0185920 A1 | 8/2006 | Hibbert | |
| 2007/0151780 A1 | 7/2007 | Tonoli | |
| 2010/0007109 A1 | 1/2010 | Mighell | |
| 2010/0044977 A1 | 2/2010 | Hughes | |
| 2010/0114468 A1 | 5/2010 | Field | |
| 2011/0006498 A1 | 1/2011 | Mercier | |
| 2011/0209929 A1 | 9/2011 | Heinzmann | |
| 2012/0181765 A1 | 7/2012 | Hill | |
| 2012/0310478 A1* | 12/2012 | Carabelli | B62K 5/08 701/38 |
| 2013/0062133 A1 | 3/2013 | Budweil | |
| 2014/0124286 A1 | 5/2014 | Hayashi | |
| 2014/0125027 A1 | 5/2014 | Rhodig | |
| 2014/0312580 A1 | 10/2014 | Gale | |
| 2014/0358369 A1 | 12/2014 | Anderfaas | |
| 2015/0054252 A1 | 2/2015 | Lee | |
| 2015/0158360 A1 | 6/2015 | Uebayashi | |
| 2015/0175184 A1 | 6/2015 | Yadan | |
| 2015/0210338 A1 | 7/2015 | Iizuka | |
| 2015/0259027 A1 | 9/2015 | Takano | |
| 2015/0274160 A1 | 10/2015 | Lee | |
| 2016/0057921 A1 | 3/2016 | Pickett | |
| 2016/0114850 A1 | 4/2016 | Takano | |
| 2017/0050693 A1 | 2/2017 | Matties | |
| 2018/0158018 A1 | 6/2018 | Luckay | |
| 2018/0281886 A1 | 10/2018 | Mizuno | |
| 2018/0298670 A1 | 10/2018 | Shomsky | |
| 2018/0334001 A1 | 11/2018 | Kato | |
| 2019/0144035 A1* | 5/2019 | Doerksen | B60G 17/018 280/124.103 |
| 2020/0102037 A1* | 4/2020 | Hirayama | B62K 5/01 |
| 2020/0262263 A1* | 8/2020 | Doerksen | B60G 17/0162 |
| 2020/0262266 A1* | 8/2020 | Weiss | B60G 13/001 |

OTHER PUBLICATIONS

Kurt Sigl, Multi-Functional, Single-Seater, Motorised Golf Cart and Golf Caddy, Mar. 24, 2005, EPO, WO 2005-025972 A1, Machine Translation of Description (Year: 2005).*

Korean Intellectual Property Office, International Search Report and Written Opinion of the International Searching Authority, dated Jun. 23, 2020, in PCT/US2020/019556, which is the international application which shares the same priority as this U.S. application.

* cited by examiner

THREE-WHEELED TILTING VEHICLE

CROSS-REFERENCES

This application claims the benefit under 35 U.S.C. § 119(e) of the priority of U.S. Provisional Patent Application Ser. No. 62/809,482, filed Feb. 22, 2019, and of U.S. Provisional Patent Application Ser. No. 62/812,918, filed Mar. 1, 2019, both of which are hereby incorporated by reference in their entireties for all purposes.

FIELD

This disclosure relates to systems and methods relating to tiltable three-wheeled vehicles.

INTRODUCTION

Three-wheeled vehicles typically have several advantages over four-wheeled vehicles. For example, under most circumstances three-wheel vehicles are, by their nature, more stable than four-wheeled vehicles due to the fact that three contact points will form a plane under all circumstances, whereas four contact points will not. Another advantage is that three-wheeled vehicles afford a nearly ideal wheel loading distribution for maximum tire traction in both acceleration and braking situations. These advantages, among others, make three-wheeled vehicles promising candidates for a variety of applications, including personal recreational vehicles, rideshare vehicles, and robotic delivery vehicles. However, the potential of three-wheeled vehicles in these fields remains largely unfulfilled.

SUMMARY

The present disclosure provides systems, apparatuses, and methods relating to three-wheeled, tiltable vehicles.

In some embodiments, a convertible, tilting vehicle may include: a pair of front wheels coupled to a tiltable chassis by a first mechanical linkage, wherein the pair of front wheels and the chassis are configured to tilt in unison with respect to a roll axis of the chassis; a single rear wheel coupled to the chassis; a motor coupled to the rear wheel and configured to drive the rear wheel to propel the vehicle; a tilt actuator operatively coupled to the chassis and configured to selectively tilt the chassis; a controller including processing logic configured to selectively control the tilt actuator to automatically maintain a net force vector applied to the chassis in alignment with a median plane of the chassis, wherein the net force vector is determined by gravity in combination with any applicable centrifugal force applied to the chassis; and a rider support platform transitionable between: (a) a first mode, in which the rider support platform is configured to support a rider thereon and to steer the vehicle in response to rider input, and (b) a second mode, in which a portion of the rider support platform is displaced to a rider-unusable position, and the vehicle is steered by the controller.

In some embodiments, a three-wheeled vehicle may include: a pair of front wheels coupled to a tiltable chassis by a tilt linkage, such that the pair of front wheels and the chassis are configured to tilt in unison with respect to a roll axis of the chassis; a single rear wheel coupled to the chassis, the rear wheel comprising a hub motor configured to drive the rear wheel to propel the vehicle; an orientation sensor configured to detect directional information regarding a net force vector applied to the chassis; a tilt actuator operatively coupled to the chassis and configured to selectively tilt the chassis; a controller including processing logic configured to selectively control the tilt actuator based on the directional information from the orientation sensor to automatically maintain the net force vector in alignment with a median plane of the chassis; and a rider support platform having a handlebar assembly and a seat, wherein the rider support platform is configured to transition between: (a) a first mode, in which the rider support platform is configured to support a rider thereon and to steer the vehicle in response to rider input, and (b) a second mode, in which the handlebar assembly is pivoted rearward toward the seat such that a rider is prevented from mounting the vehicle, and the vehicle is steered automatically by the controller.

Features, functions, and advantages may be achieved independently in various embodiments of the present disclosure, or may be combined in yet other embodiments, further details of which can be seen with reference to the following description and drawings.

DETAILED DESCRIPTION

Figure 1:
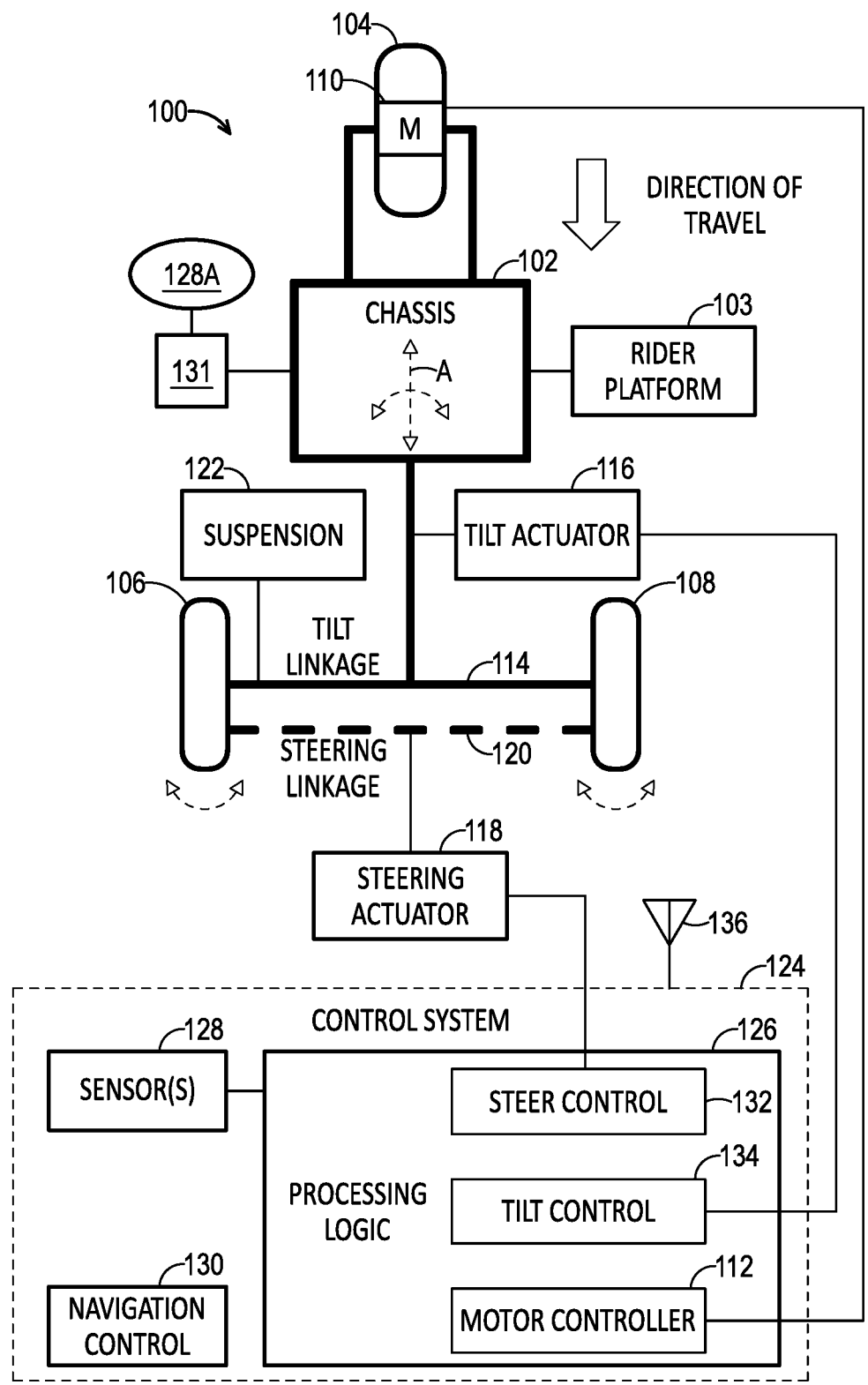
FIG. 1 is a schematic diagram of an illustrative tilting vehicle in accordance with aspects of the present teachings.

Various aspects and examples of a three-wheeled tilting vehicle, as well as related methods, are described below and illustrated in the associated drawings. Unless otherwise specified, a three-wheeled tilting vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through J, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a ridable vehicle of the present teachings may include at least one pair of tiltable wheels and a control system having processing logic configured to automatically tilt the chassis of the vehicle and in some cases actively steer the wheels of the vehicle to guide the vehicle down a selected path while maintaining a median plane of the vehicle chassis in alignment with a net force vector resulting from gravity and centrifugal force (if any). In some examples, such tilting is alternatively or additionally controlled by the operator, e.g., by a rider's body motions, via handlebars, and/or using control inputs via a human machine interface (HMI).

In illustrative examples described below, the vehicle includes three wheels, with a pair of linked wheels at a first end of the vehicle and a third wheel at an opposing end of the vehicle. However, any suitable number and arrangement of wheels may be used. A propulsion system of the vehicle may be coupled to any suitable wheel(s) to drive the vehicle forward and/or backward. For example, in some cases, the vehicle has a pair of linked wheels at a front end, a single wheel at a rear end, and a motor configured to drive the rear wheel (e.g., a hub motor).

The vehicle may be of any suitable design configured to result in a coordinated and substantially identical tilting of the chassis and the wheels. For example, a steering or suspension system of the vehicle may comprise a four-bar parallelogram linkage, coupling the left and right wheels to a central chassis. Examples of this type of vehicle are described below. In some cases, the vehicle may comprise a selectively robotic, semi-autonomous, or fly-by-wire vehicle. In some cases, the vehicle is configured to transform between a partially or completely manually operated mode and an autonomous or semi-autonomous mode.

A control system of the vehicle may include processing logic configured to automatically tilt the chassis of the vehicle and in some cases actively steer the wheels of the vehicle to guide the vehicle down a selected path while maintaining a median plane of the vehicle chassis in alignment with a net force vector resulting from gravity and centrifugal force (if any). The vehicle may be of any suitable design configured to result in a coordinated and similar or substantially identical tilting of the chassis and the wheels. For example, the vehicle may comprise a four-bar parallelogram linkage, coupling the left and right wheels to the central chassis.

Electromechanically controllable variables of the vehicle may include chassis tilt with respect to the wheel linkage, steering of the wheels, throttle or vehicle speed, and braking. In general, a control system of the vehicle may be configured to keep centrifugal and gravitational forces in equilibrium when turning, so that the combined centrifugal and gravitational vectors create a net force vector parallel to the chassis and wheel median planes. By directing the combined forces parallel to the chassis, stress on the vehicle suspension components (as well as riders where applicable) is reduced, rollover risk is decreased, and traction in a turn is improved or maximized.

An ideal leaning position of the chassis may be achieved through a combination of actuators and control software to create the desired performance. In some examples, tilt and steering angles are discretely controlled for a given turn. In some examples, steering is controlled by the operator and tilt is controlled automatically by an electronic controller of the vehicle. In general, the tilt to steer ratio is controlled, depending on speed and terrain, and higher speed leads to more vehicle chassis lean, less wheel steering. The tilt experienced at the chassis is a sum of the angle of the road surface plus the angle of the wheel linkage articulation. Detecting the level of the surface (or the chassis tilt displacement to correct) could in some cases be done using a suitable sensor near the road surface. However, it may be more effective to determine and maintain the absolute tilt angle of the chassis by measuring its relationship to the net force vector caused by gravity and any centrifugal forces.

In some cases, the interaction of crowned tires with the terrain must be accounted for, as the crowned shape of some wheels may produce scrub when tracking along the side of the wheel in a given turn vector over uneven or slanted terrain. For tilting three-wheeled vehicles, understeering or oversteering may be needed, depending on terrain, to counter the natural effect of the crowned wheel to oversteer or understeer into the turn. Generally speaking, this tire scrub is preferable to loss of the desired path of the vehicle.

Methods and systems of the present disclosure may, for example, provide for the delivery of articles, objects, products, people, or goods from one location to another location using the wheeled vehicle. Control methods may be computer implemented, either partially or totally. As described above, the wheeled vehicle may optionally be remotely controlled, semiautonomous, or mixed autonomous. The vehicle may optionally be one of a plurality of wheeled vehicles, for example one of a plurality of identical wheeled vehicles. In some examples, the vehicle is one of a fleet of vehicles of a vehicle-sharing service. A vehicle-sharing service, also referred to as a ride-sharing service, may generally utilize bicycles, scooters, mopeds, automobiles, and/or any other suitable vehicles. The vehicles of the service may or may not be identical.

The method and system of the present disclosure may optionally be used on an indoor or an outdoor land transportation network, which may include roads, bike paths, sidewalks, alleys, paths, crosswalks, any route on which a wheeled vehicle may travel or any combination of the foregoing. Additionally, or alternatively, vehicles of the present disclosure may be suitable for use on roads (e.g., traffic lanes and/or bike lanes), bike paths, sidewalks, alleys, paths, crosswalks, and/or any combination of the foregoing. The vehicles may be suitable for use on paved terrain and/or unpaved terrain (e.g., dirt, gravel, grass, and/or the like).

In some examples, a tilt-lock system is provided which allows the vehicle to be fixed in an upright, untilted position. In some examples, the system includes a tilt-lock mechanism (e.g., a pivotable bracket) configured to selectively wedge the chassis into an upright orientation. The tilt-lock system may include a kickstand, a parking brake, a tilt lock bracket, and/or any other suitable device. Components of the tilt-lock system may be implemented electronically and/or mechanically. In some examples, aspects of the tilt-lock system may be controllable by a data processing system (e.g., a smartphone running a suitable application) in communication with the vehicle. The tilt-lock system may facilitate slow-speed driving (e.g., autonomously) and/or parking of the vehicle.

In some examples, the vehicle is equipped with fleet-management features, such a communications system configured to transmit sensed vehicle information (e.g., vehicle location, tire pressure, battery charge, and/or any other suitable information) to another device, such as a remote computer system (e.g., a computer not located onboard the vehicle). This can allow for convenient monitoring and maintenance of the vehicle. In some examples, the vehicle is one of a fleet of vehicles each configured to transmit vehicle information to a central fleet management computer.

In some cases, vehicles may be associated with predetermined docking stations from which the vehicles are borrowed and to which the vehicles are returned. Alternatively or additionally, the vehicles may be dockless vehicles that are dropped off and picked up by users in arbitrary locations, such as sidewalks, parks, bike racks, building lobbies, and/or the like. A vehicle currently not in use (e.g., having been dropped off by a user) should be able to remain safely in place until needed by a subsequent user. For example, the vehicle should be configured not to easily roll away or tip over, which may endanger the vehicle and/or passersby. However, the vehicle should also be readily usable by the subsequent user; that is, not too much work should be required of the subsequent user to make the vehicle ready to ride. Systems and methods of the present disclosure may, for example, allow for a vehicle of a vehicle-sharing system to be parked in a safe and stable state when not in use (e.g., between vehicle-sharing sessions of two users, or when a user has parked the vehicle during their session). For example, a parking system of the vehicle may allow a first user to leave the vehicle in a stable condition suitable for waiting minutes, hours, and/or days for a second user.

Control system(s) of the vehicle may include any suitable processing logic for controlling the propulsion system, tilt system, and/or steering system to cause the vehicle to automatically travel along a desired path in a stable manner. Any suitable control methods may be used, including, e.g., any suitable relationship(s) between vehicle lean and vehicle steering. The control system may be further configured to enable additional vehicle functions, such as automatic unloading of vehicle contents, implementing aspects of a vehicle rental and/or ridesharing system, and so on.

Aspects of tiltable three-wheeled vehicles may be embodied as a computer method, computer system, or computer program product. Accordingly, aspects of the vehicle may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the vehicle may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of vehicles described herein may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the vehicles may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the vehicle. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of illustrative tiltable as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Tilting Vehicles

With reference to FIG. 1, this section describes an illustrative three-wheeled vehicle 100 configured to tilt or lean from side to side, e.g., while cornering. Vehicle 100 is an example of a convertible tilting vehicle, generally described above.

FIG. 1 is a schematic diagram of vehicle 100. As depicted, vehicle 100 has three wheels coupled to a body or chassis 102, with a single drive wheel 104 in the rear and two wheels 106, 108 in front. Rear wheel 104 is driven by a motor 110, e.g., a hub motor, which is controlled by a motor controller 112 to propel the vehicle in forward and reverse directions. Front wheels 106 and 108 are coupled to a front end of chassis 102 by a tilt linkage 114 configured to tilt the chassis of the vehicle as well as the front wheels, in a controlled manner. Tilt linkage 114 may include any suitable mechanical linkage, such as a four-bar linkage, configured to ensure a tilt of the front wheels corresponds to the tilt of the chassis. A tilt actuator 116 (also referred to as a lean actuator or roll actuator) is operatively connected to tilt linkage 114, and may include any suitable electric motor (e.g., servo motor, step motor), rotary actuator, or other device configured to provide a rotational force for tilting the chassis and wheels.

A rider support platform 103 is mounted to chassis 102, and may include any suitable structures and devices configured to accommodate a human rider and/or to receive control input from the rider. For example, rider support platform 103 may include a seat, a backrest, foot pegs, pedals, handlebars, and/or the like. In cases where handlebars are provided, these may be electromechanically and/or virtually coupled to the steering actuator (described immediately below), such that one or both of the handlebars and the steering actuator may selectively control the steering at any given time. A portion or portions of the rider support platform may be repositionable in a functional sense, such that repositioning or displacing the portion of the platform sends a signal to change control modes and/or physically places the vehicle into a different control mode. For example, the handlebars and/or seat may be folded into an unusable position to place the vehicle into an autonomous or semiautonomous mode.

Steering of the vehicle may be accomplished by tilting and/or by controlled steering of the front wheels, e.g., using a steering actuator 118 operationally connected to a steering linkage 120. Various illustrative steering schemes are described further below. In this context, tilt or lean is defined as a lateral roll from side to side about a roll axis (e.g., axis A), while steering is performed by rotating the wheel or wheels about a yaw axis, such that the wheels point in a direction more to the left or right relative to their present orientation. At some vehicle speeds, steering may be performed entirely by way of tilting, while the front wheels are free to caster. At some vehicle speeds, steering may be performed entirely by actively steering the front wheels. At some vehicle speeds, a combination of methods may be utilized.

Steering actuator 118 may include any suitable electric motor (e.g., servo motor, step motor), rotary actuator, or other device configured to provide a rotational force for steering vehicle 100. This force from the steering actuator is converted by the steering linkage into a linear force for turning the wheels. The steering linkage may, for example, include one or more tie rods configured to mechanically couple actuator 118 to wheels 106 and 108. In some examples, steering linkage 120 is an Ackermann steering linkage, such that control of the front wheels automatically compensates for the inside and outside wheel needing to trace circles of different radii during a given turn.

In some examples, vehicle 100 utilizes servo motors with planetary gearboxes for both the lean and the steer actuators. Other suitable actuators include worm gear boxes, linear actuators connecting linkage elements, hydraulic actuators, harmonic drive units, stepper motors, direct torque actuators, and/or the like. Generally, the tilt actuator has a higher load requirement, and must generate more force than the steering actuator, such that different types of actuators may be used for each.

A suspension system 122 may be integrated into tilt linkage 114, steering linkage 120, and/or coupled to wheels 106 and 108. A separate suspension system may be provided for rear wheel 104. Suspension system 122 may include any suitable biasing and/or damping device(s) configured to facilitate travel over a rough or bumpy terrain. For example, suspension system 122 may include one or more shock absorbers and/or springs. Suspension system 122 is configured to reduce shock and vibration loads to cargo as well as to the sensing and control systems and vehicle chassis. There are several possible approaches to suspending the vehicle in a shock absorbing manner, including but not limited to: four-bar linkages, leading links, A-arms, linear/telescoping direct suspension, and/or the like.

A control system 124 (e.g., an onboard control system) of vehicle 100 may include any suitable processing logic 126 configured to control the various actuators in view of information from one or more vehicle sensors 128 and/or in response to commands received from a navigation control system 130. Navigation control system 130 may include any suitable navigation system configured to direct vehicle 100 along a path toward a destination, and disposed either onboard vehicle 100, remotely (e.g., a remote-control unit), or a combination thereof.

Sensors 128 may include any suitable devices configured to determine information regarding vehicle 100 and/or its physical operating environment. For example, sensors 128 may include sensing units typically found on autonomous vehicles. Example sensors may include temperature sensors, tire pressure sensors, tilt or other orientation sensors (e.g., accelerometers), speed sensors, and/or the like.

Additionally, or alternatively, sensors 128 may include at least one orientation-dependent sensor 128A configured to sense information (e.g., regarding a surrounding environment) in an orientation-dependent manner. In other words, information sensed by sensor 128A tends to be affected, in at least some circumstances, by the orientation and/or position of the sensor with respect to at least one axis. Example orientation-dependent sensors may include, e.g., LIDAR, radar, laser range-finders, optical imaging sensors, thermal imaging sensors, a computer vision system, proximity sensors, etc. The information sensed by these types of sensors generally depends on sensor orientation. For instance, the orientation of an image acquired by an imaging sensor is determined by the orientation of the imaging sensor, and the information obtained by a LIDAR sensor depends on the position and direction of the light source. Accordingly, if the orientation-dependent sensor is tilted (e.g., as the vehicle chassis and/or linkage is tilted), the data acquired by the sensor is generally altered relative to data that would be acquired by an untilted sensor. This can adversely impact the use of the data by control systems of the vehicle (e.g., navigation control system 130, a collision-avoidance system, etc.). Accordingly, orientation-dependent sensor 128A may be coupled to chassis 102 (and/or another suitable part of the vehicle) by a tilt-compensating mount system 131 configured to compensate for vehicle tilt (at least on the roll axis), such that sensor 128A remains partially or completely untilted as the vehicle tilts. For example, tilt-compensating mount system 131 may comprise a gimbal mount.

Tilt-compensating mount system 131 may comprise an active tilt-compensation system and/or a passive tilt-compensation system. An active tilt-compensation system includes at least one motor or other actuator configured to adjust an orientation of sensor 128A based on a detected tilt of the sensor (e.g., as detected by a tilt sensor coupled to the sensor or to the gimbal mount), and/or based on an anticipated tilt of the vehicle (e.g., based on a control signal to the tilt actuator and/or steering actuator, which apprises system 131 that sensor 128A will imminently tilt without intervention). A passive tilt-compensation system may include a gyroscope or other suitable device configured to attach sensor 128A to the chassis such that the sensor does not tend to tilt as the vehicle tilts. In some examples, the tilt-compensation system may include a mechanical linkage slaved to the tilt linkage 114, such that a corresponding counter-lean is automatically produced in the tilt-compensation system.

Tilt-compensating mount system 131 may be configured to compensate for tilt about any suitable axis or combination of axes. In some examples, system 131 is configured to compensate for tilt about the vehicle roll axis only. Accordingly, in these examples, sensor 128A is effectively stabilized about the roll axis, such that it does not tilt with respect to horizontal when the vehicle is caused to tilt, but is not prevented from tilting with the vehicle about a pitch axis or a yaw axis.

Processing logic 126 may include any suitable modules or hardware configured to carry out control algorithms with respect to the operation of vehicle 100. For example, processing logic 126 may include motor controller 112, a steering controller 132 configured to control steering actuator 118, and/or a tilt controller 134 configured to control tilt actuator 116, as well as processing logic configured to coordinate the activities of any or all of these controllers.

Control system 124 may be in wireless communication with a remote system, e.g., a remote portion of navigation control 130, and therefore may include a wireless radio system configured to transmit and receive information, e.g., as represented by a transceiver 136.

Several illustrative steering schemes may be implemented by the control system and vehicle 100. In manual/rider mode, tilt will generally be controlled to automatically maintain the net force vector in alignment with a median plane of the chassis, based on or in response to steering by the user. In autonomous mode, there are several possible relationships of lean (i.e., tilt) to steering. Selected relationships and related control system configurations are discussed below:

a. Mechanically Linked Lean to Steer

In this case, the mechanical linkages result in a fixed ratio to cause the wheels of the vehicle to be turned when they lean. In embodiments of this type, it may be desirable to dynamically change the lean-to-steer ratio with respect to speed, to provide both low speed maneuverability and high speed stability.

b. Electrically Linked Lean to Steer

In this case, lean angle is the primary control vector utilized to determine how much to actively steer the vehicle. Steering is controlled by the steering controller and actuator, based on the lean angle, vehicle speed, and other factors.

c. Free to Caster (FTC)

In this case, lean angle is the primary control vector for the vehicle, and the steering system is left free to assume any position. In other words, active steering is discontinued, and the wheels are freed to swivel or caster based entirely on ground forces and lean angle. Based on a trail/caster angle, the vehicle will mechanically select an optimum steering angle for the lean angle. This technique works well at higher speeds.

In FTC operation, the vehicle geometry is designed so that when tilt is initiated, the front wheels will caster or swivel to the proper steering angle for any given combination of lean and speed. This relationship can be roughly expressed as $S=T/V$, where $S$ is steer angle, $T$ is tilt angle, and $V$ is velocity. In a given turn, if the maximum lean has already been achieved, but the vehicle needs to turn more tightly, reducing speed will cause the turn radius to decrease in accordance with the FTC dynamics.

With FTC, a vehicle will also counter-steer when entering a drift from loss of rear wheel traction, and will also counter-steer in the case of one front wheel coming off the ground during the initiation of tilt with a high center of gravity (CG) or a very narrow wheelbase. A tilting three-wheeled vehicle utilizing an FTC control scheme is resistant to flipping over for this reason.

d. Free Leaning

In this case, the steering angle is the primary control vector and the vehicle is free to lean. Embodiments of this type may use a tilt-locking mechanism to prevent undesirable instabilities, maintaining the vehicle at a set angle (e.g., vertical) or range of angles. Furthermore, the steering angle may operate under closed-loop control to balance the vehicle, similar to the way a bicyclist or motorcyclist balances their vehicle using a combination of body lean, counter-steering, and other inputs.

e. IMU-Based Lean Follows Steer

In this case, steering angle is the primary control vector for the vehicle. Accelerometer and/or gyro sensors sense the lateral forces on the vehicle, and the tilt actuator runs a control loop to minimize the component of lateral acceleration showing a tendency to slide the vehicle out of the turn.

f. Combination Methods

In some cases, the above techniques can be used in combination with clutches/brakes on either the steer or lean actuators or both, or the actuators can be programmed into a "simulated low-inertia control mode" where they act as followers. This can be turned on and off (gradually) at certain vehicle speed breakpoints to provide optimal handling in both the low and high-speed domains. Additionally, control rules may need to be modified when the vehicle is operating in reverse.

For any of the above control schemes, a desired tilt angle for the vehicle in question is in general derived by determining what side-to-side lean or tilt angle results in a net force vector aligned with the central vertical plane of the chassis, also referred to as the median plane, i.e., a plane through the vertical centerline of the vehicle dividing or bisecting the chassis into left and right portions. The net force vector is defined as the combined force vector resulting from downward gravity and lateral centrifugal force. A sensor (e.g., an accelerometer) on the vehicle detects lateral deflection of the force vector on the chassis (e.g., due to centrifugal forces from initiating a steered turn, or lateral forces from uneven terrain during a turn or during normal operation). In response, a tilting actuator and in some cases a steering actuator are adjusted to return the net force vector to substantial alignment with the median plane of the chassis. Lean angle changes with speed and tightness of turn radius. Given the desired or optimum tilt angle for a given turn radius and/or speed, (i.e., the angle that keeps the net force vector in alignment with the chassis) the tilt linkage may be altered to maintain that tilt angle, and also to keep the tilt angle regardless of uneven/changing ground surface.

Lean (AKA tilt) to steer ratios are calculated to maintain the summary force vector (with respect to centrifugal force and the force due to gravity) in alignment with the median plane of the tilting vehicle. Generally speaking, the faster the vehicle goes for any given turn radius, the more the vehicle chassis needs to lean in order to keep this summary force vector in alignment with the median plane of the tiltable chassis. Higher speed or decreased turning radius results in an increase to the desired lean angle.

Control system 124 may include any suitable processing logic configured to carry out algorithms such as those described herein. For example, a PID (proportional integral derivative) controller may be utilized, having a control loop feedback mechanism to control tilt/steer variables based on force vector measurement.

For example, during the turning of vehicle 100, while lateral accelerations and/or centrifugal forces are exerted on chassis 102, vehicle control system 124 may direct the one or more tilt actuators 116 to pivot and/or tilt chassis 102 so as to compensate in whole or in part for such lateral accelerations and/or centrifugal forces. Processing logic 126 may receive input from one or more of sensors 128, to measure such accelerations, centrifugal forces and/or other characteristics of chassis 102 so as to determine the degree, amount, and/or angle to which the chassis should be pivoted and/or tilted by the one or more tilt actuators 116. For example, an IMU sensor, which may be included in the one or more sensors 128, and may optionally include a solid-state accelerometer, may be utilized for measuring any suitable acceleration and/or force in this regard. The degree, amount, and/or angle of such tilt may be sensed and/or measured by any suitable sensor, and directed back to processing logic 126 and/or other aspects of the control system as feedback. Any suitable algorithm may be programmed into the control system, either as firmware, software or both, for analyzing the input signals provided by one or more sensors and for instructing and/or controlling the one or more tilt actuators.

One or more braking mechanisms of vehicle 100 may be controllable by control system 124 to cause slowing of the vehicle along its direction or path of travel.

In some examples, vehicle 100 is directed by control system 124 to travel over a transportation network from a first location to a second location. Instructions regarding the second location and/or path(s) between the first and second locations may be stored in a memory of the vehicle control system, received by the vehicle control system from another source (e.g., a remote control), determined by the vehicle control system, and/or derived in any other suitable way. In some examples, such instructions are relayed to the vehicle from another location during the course of travel from the first location to the second location. In some examples, vehicle controller receives GPS information (e.g., from an onboard GPS receiver, or indirectly from another source) for use in charting the course of travel from the first location to the second location. In some examples, the vehicle control system determines and/or adapts the course of travel based on readings from an onboard camera, LIDAR system, computer-vision system, proximity sensor, and/or the like.

In some examples, a course of travel between the first and second location is determined in advance (i.e., before the vehicle begins to travel), and may optionally be updated during travel (e.g., for collision avoidance). In some examples, the course of travel is determined as the vehicle travels, such that at any given time, the vehicle control system only knows a small portion of the travel path it will imminently take.

Based on the instructions, control system 124 sends appropriate commands to the motor, tilt actuator, and/or steer actuator to control the speed and direction of travel of the vehicle. Depending on the mode in which the vehicle is operating, the tilt actuator and steer actuator do not necessarily each receive instructions. For example, in a free-to-caster mode, the steering actuator is not used. In a free-leaning mode, the tilt actuator is not used.

Processing logic 126 receives input signals from one or more of sensors 128 that indicating lateral accelerations and/or centrifugal forces exerted on the vehicle (e.g., during turns). In response, the processing logic sends appropriate commands to the one or more tilt actuators 116 to pivot and/or tilt chassis 102 of the vehicle relative to the travel surface and/or appropriate reference line or plane into a turn so as to compensate for such lateral accelerations and/or centrifugal forces.

In some examples, a PID loop of the control system is configured to automatically modulate a speed of the vehicle to attain desired turn radii. For example, if a tighter turn is needed, the vehicle may slow automatically, rather than steering or tilting, thereby reducing the turn radius.

B. Illustrative Tilt and Steering Linkages

As shown in FIGS. 2-7, this section describes illustrative tilt linkages and steering linkages systems suitable for use with vehicle 100, each of which is an example of tilt linkage 114 and/or steering linkage 120, described above.

Figure 2:
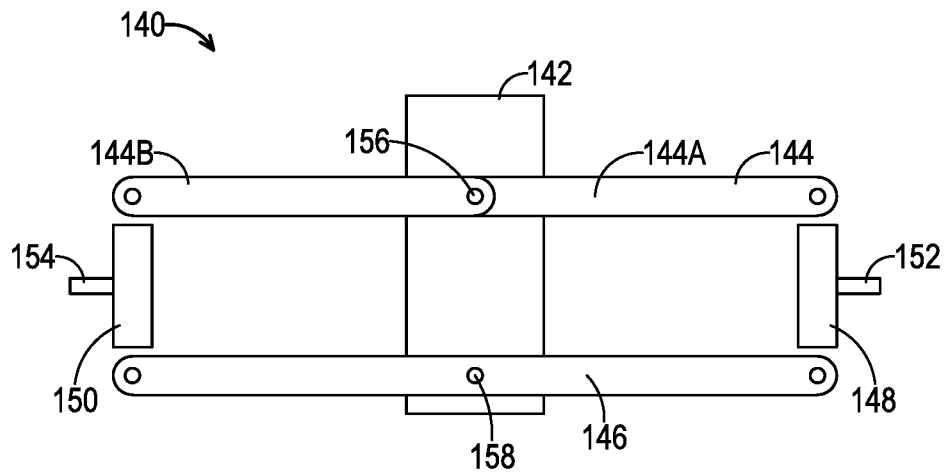
FIG. 2 is a front view of an illustrative tilting linkage in accordance with aspects of the present teachings.

FIGS. 2-5 depict selected versions of suitable mechanical tilt linkages. In some examples, the tilt linkage may include a simple four-bar parallelogram linkage. Other suitable mechanical linkages are described below. FIG. 2 depicts an illustrative four-bar mechanical tilt linkage 140 coupled to a chassis 142 of a three-wheeled vehicle substantially similar to vehicle 100. Linkage 140 includes an upper bar 144 and a lower bar 146, each coupled at outboard ends to a left kingpin 148 and a right kingpin 150. As used herein, the term kingpin refers generally to the component(s) comprising the main pivot for steering each wheel. As depicted in FIG. 2, each of kingpins 148 and 150 includes an axle 152, 154 for rotational attachment of the respective wheels. The upper bar, lower bar, and kingpins may each be referred to as a "link" in the four bar linkage.

In this example, upper bar 144 is divided into two portions, 144A and 144B, which pivot at a common pivot joint 156. Lower bar 146 is a single piece, and is coupled to the tilt actuator at a central pivot joint 158. Rotary pivot 156 in the middle of the upper link facilitates the use of a rotary bearing at the attachment location between the top of the linkage and tilting chassis 142. In the case of a single rigid link, a linear bearing or some amount of free-play may be used, to compensate for the condition wherein the kingpins are not perfectly parallel, but may have some "tilt Ackermann" (i.e., Ackermann steering geometry) to allow unequal tilting angles for the front wheels.

Figure 3:
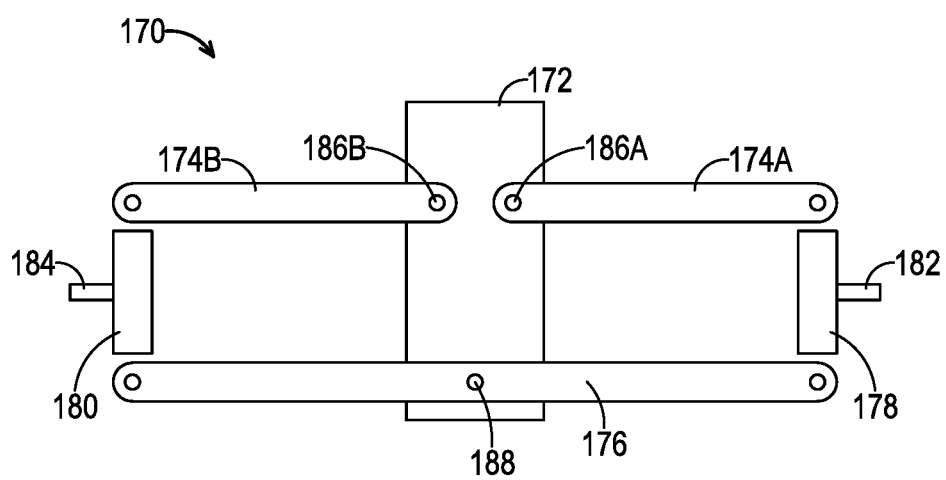
FIG. 3 is a front view of another illustrative tilting linkage in accordance with aspects of the present teachings.

FIG. 3 depicts another illustrative four-bar mechanical tilt linkage 170, coupled to a chassis 172 of a three-wheeled vehicle substantially similar to vehicle 100. Linkage 170 includes a pair of upper bars 174A and 174B, and a lower bar 176, each coupled at outboard ends to a left kingpin 178 and a right kingpin 180. As depicted in FIG. 3, each of kingpins 178 and 180 includes an axle 182, 184 for rotational attachment of the respective wheels. The upper bars, lower bar, and kingpins may each be referred to as a "link" in the mechanical linkage.

In this example, upper bars 174A and 174B are separated or spaced from each other, such that each upper bar has a unique pivot joint 186A, 186B. Lower bar 176 is a single piece, and is coupled to the tilt actuator at a central pivot joint 188. Rotary pivots 186A and 186B at the middle ends of the upper links again facilitates tilted or differently-tilting kingpins. The kingpins may be referred to in some examples as "steering knuckles," as they include connection points for various components of the steering system.

Figure 4:
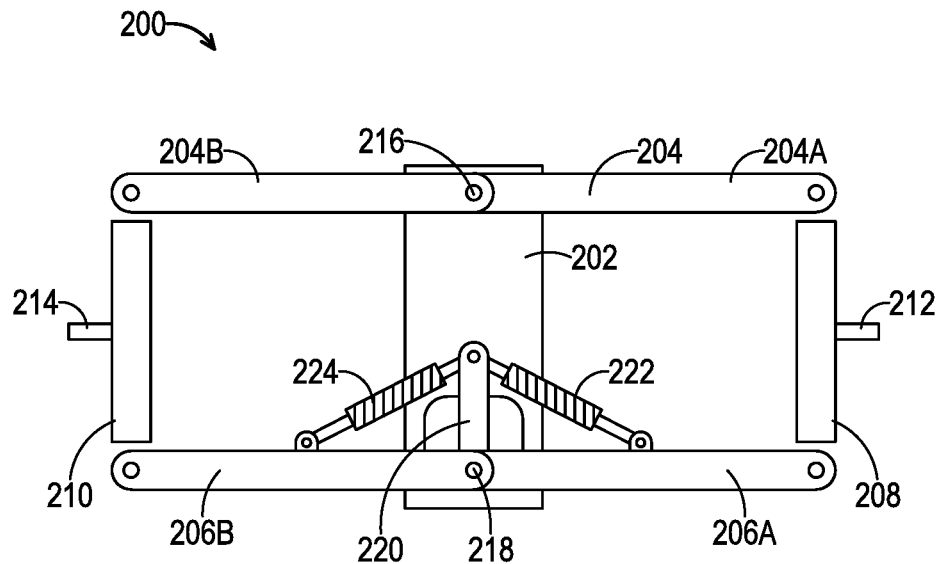
FIG. 4 is a front view of an illustrative tilting linkage with shock absorbers in accordance with aspects of the present teachings.

FIG. 4 depicts an illustrative A-arm mechanical tilt linkage 200 coupled to a chassis 202 of a three-wheeled vehicle substantially similar to vehicle 100. Linkage 200 includes an upper bar 204 divided into two portions 204A and 204B, and a pair of lower bars 206A and 206B, each coupled at an outboard end to a left kingpin 208 and a right kingpin 210. As depicted in FIG. 4, each of kingpins 208 and 210 includes an axle 212, 214 for rotational attachment of the respective wheels.

In this example, upper bar 204 is divided into portions 204A and 204B, which pivot at a common pivot joint 216. Lower bars 206A and 206B are coupled at inboard ends to a central pivot joint 218. An actuator arm 220 extends upward from the pivot joint, and is rotated by the tilt actuator. The actuator arm may be referred to as a rocker. Each of the lower bars is coupled to a distal end of the actuator arm by a respective shock absorber or gas spring 222, 224. Upper portions 204A and 204B, and/or lower portions 206A and 206B may each comprise an A-arm or wishbone-shaped arm, with the apex of the arm on the outboard end. See FIGS. 13-14.

Figure 5:
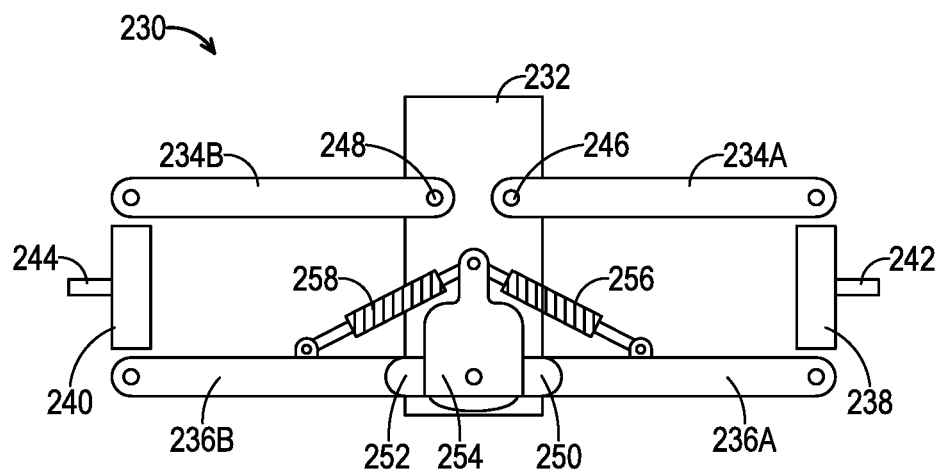
FIG. 5 is a front view of another illustrative tilting linkage with shock absorbers in accordance with aspects of the present teachings.

FIG. 5 depicts another illustrative A-arm mechanical tilt linkage 230 coupled to a chassis 232 of a three-wheeled vehicle substantially similar to vehicle 100. Linkage 230 includes a pair of upper bars 234A and 234B, and a pair of lower bars 236A and 236B, each coupled at an outboard end to a left kingpin 238 and a right kingpin 240. As depicted in FIG. 5, each of kingpins 238 and 240 includes an axle 242, 244 for rotational attachment of the respective wheels.

In this example, inboard ends of upper bars 234A and 234B pivot at unique pivot joints 246 and 248. Lower bars 236A and 236B are coupled at inboard ends to unique pivot joints 250 and 252 on an actuator plate 254. Plate 254 extends upward from the pivot joints and is rotated by the tilt actuator. The actuator plate may be referred to as a rocker. Each of the lower bars is coupled to a distal end of the actuator plate by a respective shock absorber or gas spring 256, 258. Upper portions 234A and 234B, and/or lower portions 236A and 236B may each comprise an A-arm or wishbone-shaped arm, with the apex of the arm on the outboard end. See FIGS. 15-16.

In some examples, the suspension system for the tilt linkage may include a leading link swingarm configuration, situated between the steering kingpin and the wheel. This results in an acceptable suspension solution. However, the trail dimension and scrub radius change slightly when the suspension is compressed between the kingpin and the wheel.

Figure 6:
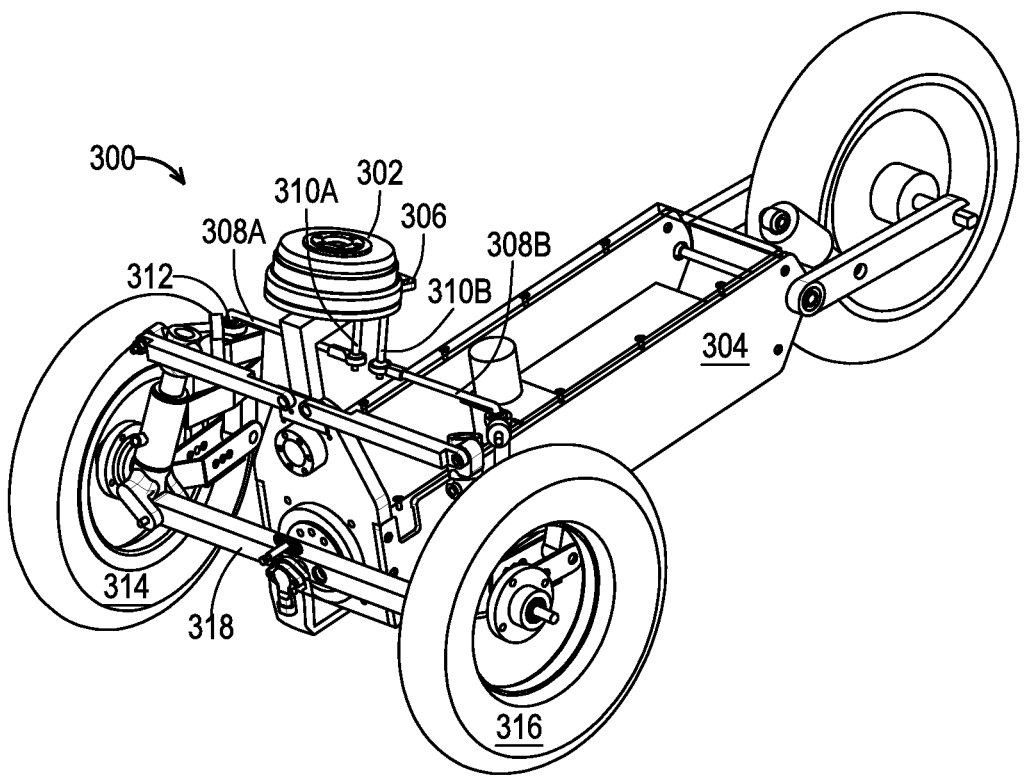
FIG. 6 is an isometric view of an illustrative steering linkage in accordance with aspects of the present teachings.

FIG. 6 depicts an illustrative steering linkage 300 suitable for use in tilting vehicles of the present disclosure, wherein the steering actuator is mounted in a vertical orientation. In other words, the axis of rotation of the actuator is substantially vertical or upright, and/or orthogonal to a centerline of the chassis.

Steering linkage 300 is an example of steering linkage 120. In this example, a steering actuator 302 is mounted vertically on a front end of a chassis 304. A steering crank 306 is rotated by the actuator, and a pair of tie rods 308A and 308B are coupled to the respective connecting rods of the steering crank at a respective pivot joints 310A and 310B. Outboard ends of tie rod 308A and tie rod 308B are coupled to respective steering knuckles 312 of front wheels 314 and 316. A tilt linkage 318 is coupled to the front wheels, and is depicted as a four bar linkage, but may include any suitable tilt linkage described herein.

Figure 7:
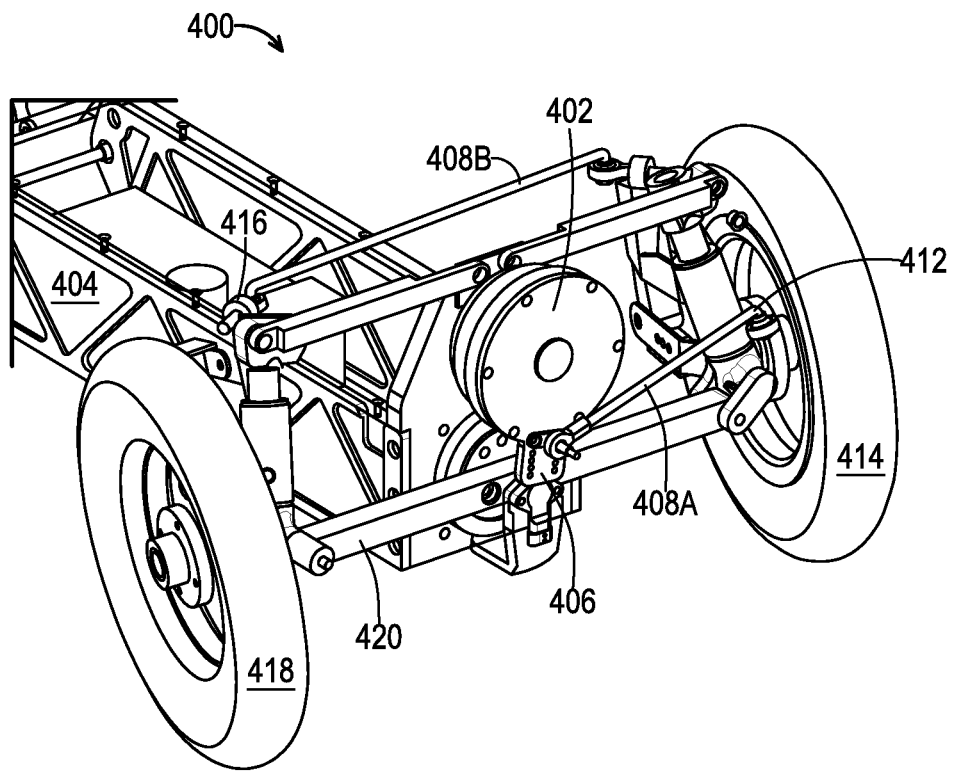
FIG. 7 is an isometric view of another illustrative steering linkage in accordance with aspects of the present teachings.

FIG. 7 depicts another illustrative steering linkage 400 suitable for use in tilting vehicles of the present disclosure, wherein the steering actuator is mounted in a horizontal orientation. In other words, the axis of rotation of the actuator is substantially horizontal and/or parallel to a centerline of the chassis.

Steering linkage 400 is an example of steering linkage 120. In this example, a steering actuator 402 is mounted horizontally on a front end of a chassis 404. A steering crank 406 is rotated by the actuator, and a single tie rod 408A is coupled to the steering crank at a single pivot joint 410. An outboard end of tie rod 408A is coupled to a steering knuckle 412 of one front wheel 414. A second tie rod 408B is coupled to an opposite side of the same kingpin, and coupled at another end to a second steering knuckle 416 of another front wheel 418. Accordingly, rotation of the steering actuator rotates the steering crank, which transmits motion to one front wheel via a first tie rod and a first steering knuckle. The opposite front wheel is rotated in unison by way of a second tie rod connecting the first steering knuckle to the second steering knuckle of the second wheel. In this example, the two tie rods are on opposite sides of the kingpins. In other words, one of the tie rods is disposed in front of the kingpins and the other is disposed behind the kingpins. A tilt linkage 420 is coupled to the front wheels, and depicted as a four bar linkage, but may include any suitable tilt linkage described herein.

C. Illustrative Transforming Vehicle

As shown in FIGS. 8-13, this section describes an illustrative tilting vehicle 500 that is an example of vehicle 100 described generally above, and which is configured to be mechanically transformed or converted between a first mode and a second mode of operation (also referred to as configurations or stages).

Figure 8:
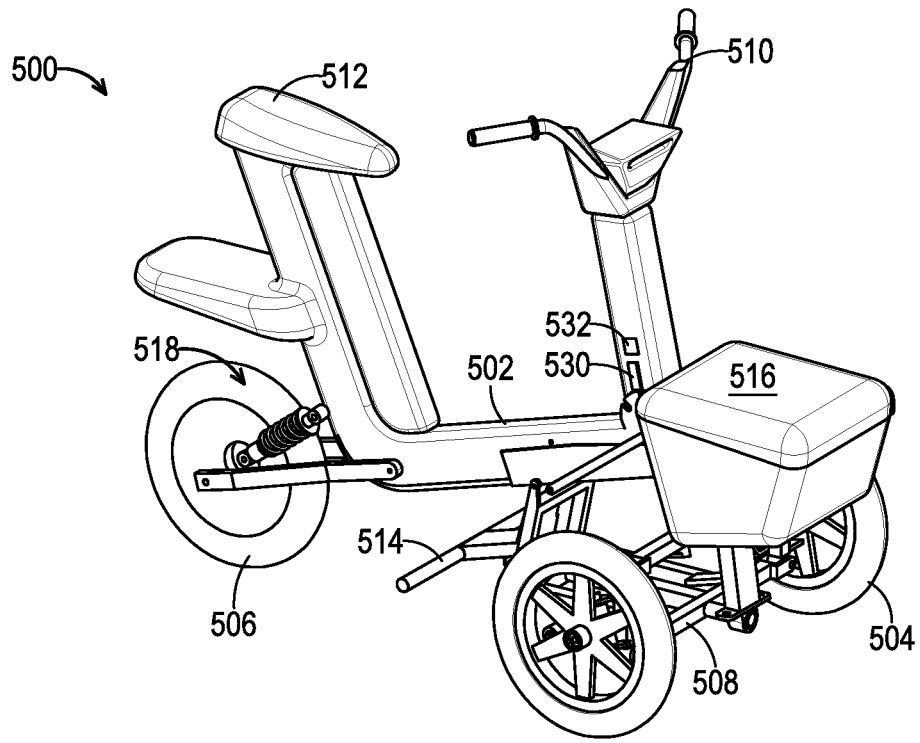
FIG. 8 is an isometric view of an illustrative transformable tilting vehicle in accordance with aspects of the present teachings, depicting the vehicle in an upright configuration.

The first mode includes operating vehicle 500 as a manned and tilting vehicle, controlled entirely or in part by the operator (see FIG. 8). In this configuration, the vehicle may be ridden either like a two-wheeler, through forward motion and balancing/counter-steering, or like a Sway Lithium three-wheeled vehicle, with foot activation of tilt, or some other mechanism, e.g., a steering wheel. In some examples, steering is handled manually or with a powered assist feature, while a corresponding tilt of the vehicle is controlled automatically.

Figure 11:
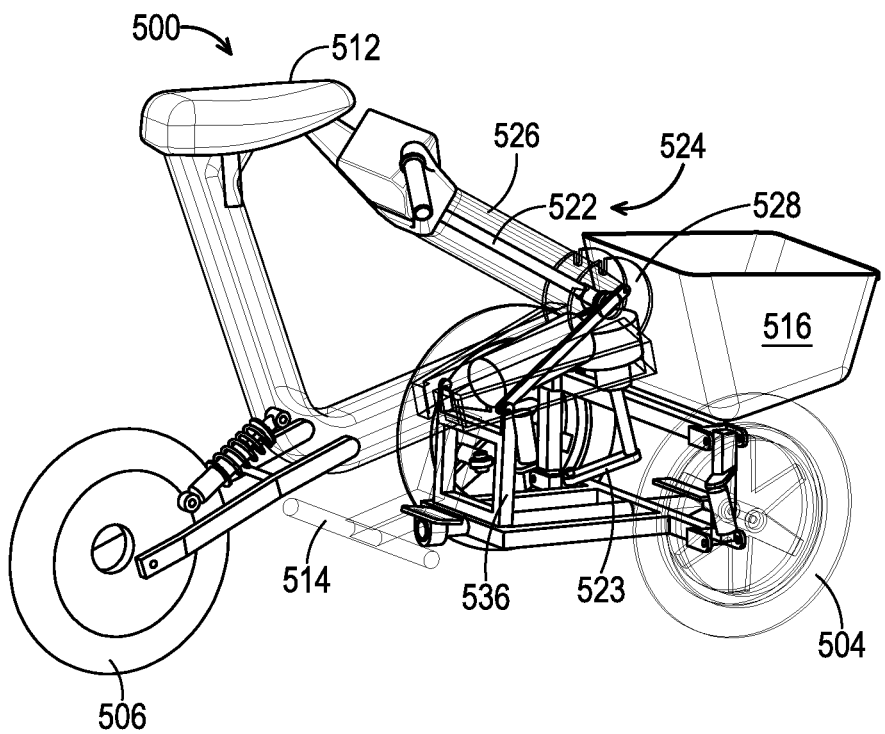
FIG. 11 is another partially transparent isometric view of the vehicle of FIG. 9, depicting the vehicle in a tilt-locked, autonomous mode.

The second mode includes autonomously operating vehicle 500, e.g., in a tilt-locked and fly-by-wire manner, for the purposes of hailing, ride-sharing, delivery, parking, accessing re-charging stations and general tasking and fleet management (see FIG. 11). Tilt-locking the vehicle facilitates low-speed operation by effectively disabling the tilt features of the vehicle while leaving steering features enabled.

Figure 9:
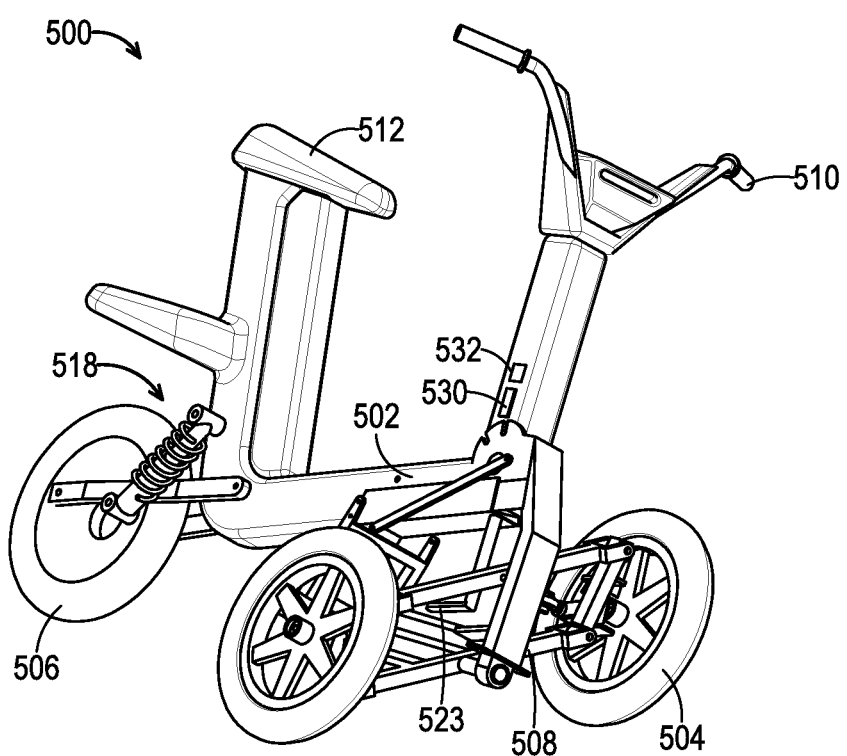
FIG. 9 is another isometric view of the vehicle of FIG. 9, depicting the vehicle in a tilted configuration.

Vehicle 500 includes a chassis 502 coupled to a pair of front wheels 504 and a single rear wheel 506. Front wheels 504 are attached to the chassis by a four-bar tilt linkage 508, although any of the tilt linkages described herein may be utilized. Front wheels 504 are steerable using a handlebar 510, which is assisted or in some cases functionally replaced by a power steering system (see below). A rider is further accommodated on vehicle 500 by a seat 512 and a pair of foot pegs 514. An optional cargo compartment 516 may be mounted to a front end of the vehicle. Vehicle 500 may include a suspension system 518, partially shown in FIGS. 8 and 9. FIG. 8 is an isometric view of vehicle 500 in an untilted state, and FIG. 9 depicts the vehicle in a tilted state.

A steering actuator 520 (also referred to as a power steering unit) is located in-line with a main steering shaft 522 coupled to handlebar 510. Actuator 520 is affixed to central tilting chassis 502, and in this example includes a motor and a right-angle gearbox. Steering actuator 520 drives a steering crank 523 (see, e.g., FIG. 9), which operates generally as described above with respect to FIGS. 6 and 7. Steering tie rods and other already-described portions of the steering system are omitted from FIGS. 8-11 for simplicity.

In some embodiments of the manual operating mode, the power steering unit is inactive, but may be back-driven by rider input from the handlebars. In other words, the motor and gearbox may be freely rotatable using the handlebars. In autonomous mode, the power steering unit actively steers the vehicle in response to a navigation controller, using an onboard controller and array of sensors to follow a commanded path.

Figure 10:
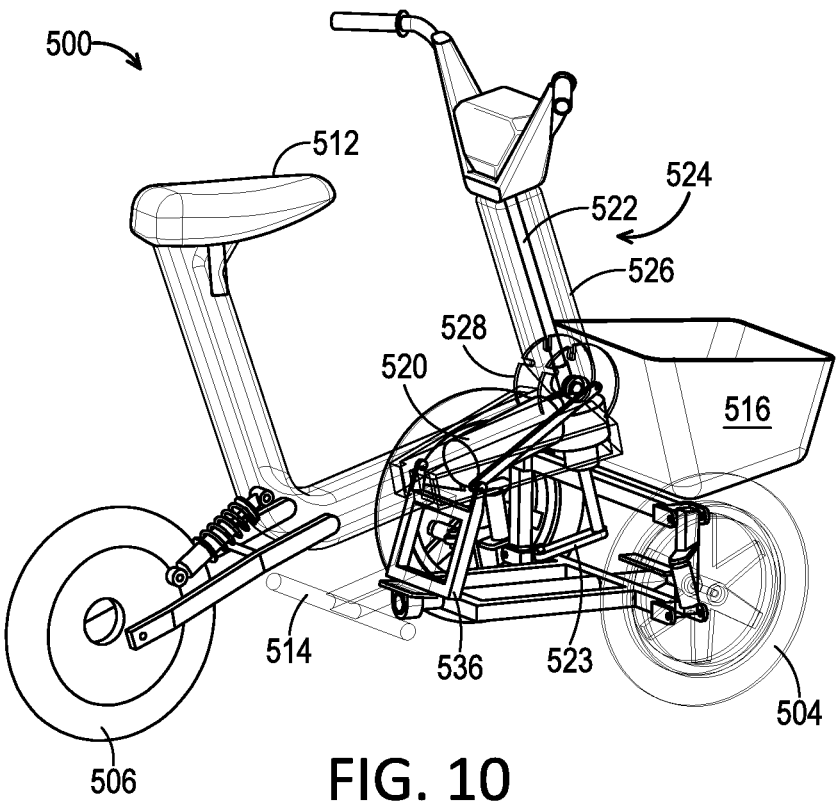
FIG. 10 is another isometric view of the vehicle of FIG. 9, depicting portions of the vehicle as transparent, and depicting the vehicle in an upright, manned mode.

As depicted in FIGS. 10 and 11, handlebar 510 includes an elongate handlebar stem assembly 524, which includes steering shaft 522 and a rigid housing 526. Stem assembly 524 is pivotably coupled to chassis 502, and includes a pin-and-slot locking device 528 configured to mechanically lock stem assembly 524 in a selected one of two or more predetermined orientations. Slots of the locking device are configured to receive a locking pin 530 of the stem assembly. The handlebars (i.e., handlebar 510 and stem assembly 524) are pivotable about a generally horizontal axis orthogonal to the direction of travel (also referred to as a pitch axis). The position of locking pin 530 may be determined by a locking pin position sensor 532.

Changing between the two modes of operation may be achieved manually, semi-automatically, or automatically, by mechanically transforming the vehicle physically from a tilting three-wheeled configuration into a non-tilting three-wheeled configuration. In the non-tilting second configuration, the vehicle may be autonomous, remotely controlled, or fly-by-wire (e.g., autonomous or semi-autonomous).

In the present embodiment, this transformation is achieved by folding the handlebars rearward toward the seat, and down. This motion prevents an operator from being able to mount the vehicle, and also actuates a mechanical linkage 534 disposed between stem assembly 524 and tilting chassis 502. Linkage 534 is configured to secure a tilt-lock feature 536 of the vehicle. In some examples, sensor 532 (and/or another position sensor) then indicates that the machine is upright and tilt-locked, ready for autonomous mode.

The overall transformation mechanism may be biased to the unlocked configuration, e.g., lightly sprung, with a latch that releases when the customer gets within range or triggers a button on the app. This facilitates a mode in which the vehicle rolls up to the customer and automatically transforms to a rideable configuration without any physical input from the customer.

The transformation from manned configuration to autonomous mode may include any suitable mechanical transformation mechanism, such as folding the seat forward or backward, or such as transforming the frame or chassis to reduce the wheel base, increase track width, or otherwise improve stability or performance in tilt-locked autonomous mode.

In some examples, when the vehicle arrives at the customer, the customer may activate a mode through an associated software application (e.g., a smartphone app) to unlock the machine automatically, e.g., via a spring release or servo motor or other automatic electromechanical mode of actuation. In some examples the user may instead transform the vehicle manually, e.g., by lifting the handlebars, releasing a latch, or otherwise interacting with the machine mechanically. In some example, a combination of automatic and manual actions may be taken.

Figure 12:
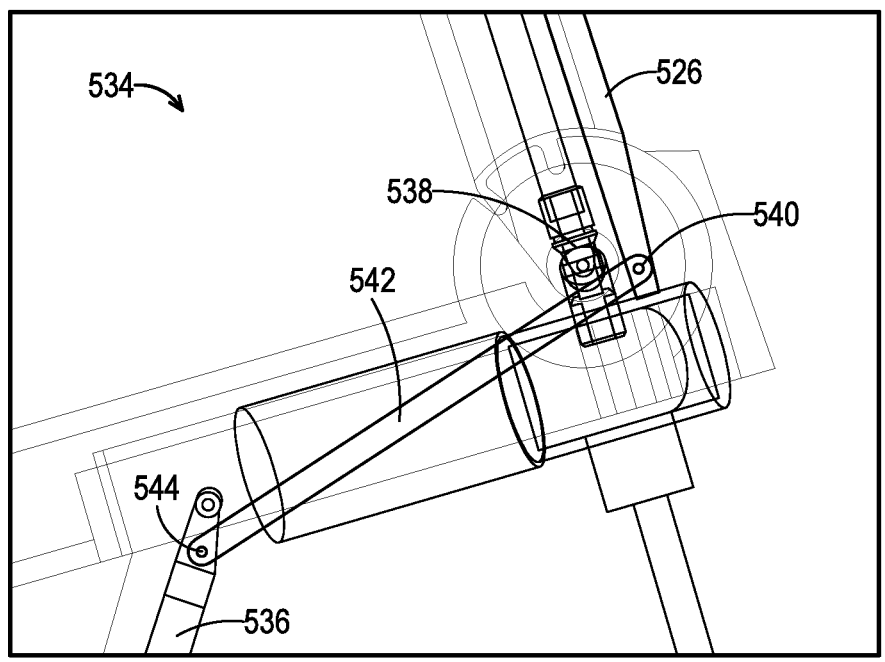
FIG. 12 is a side view of an illustrative cam-over mechanism of the transforming vehicle of FIG. 9.
Figure 13:
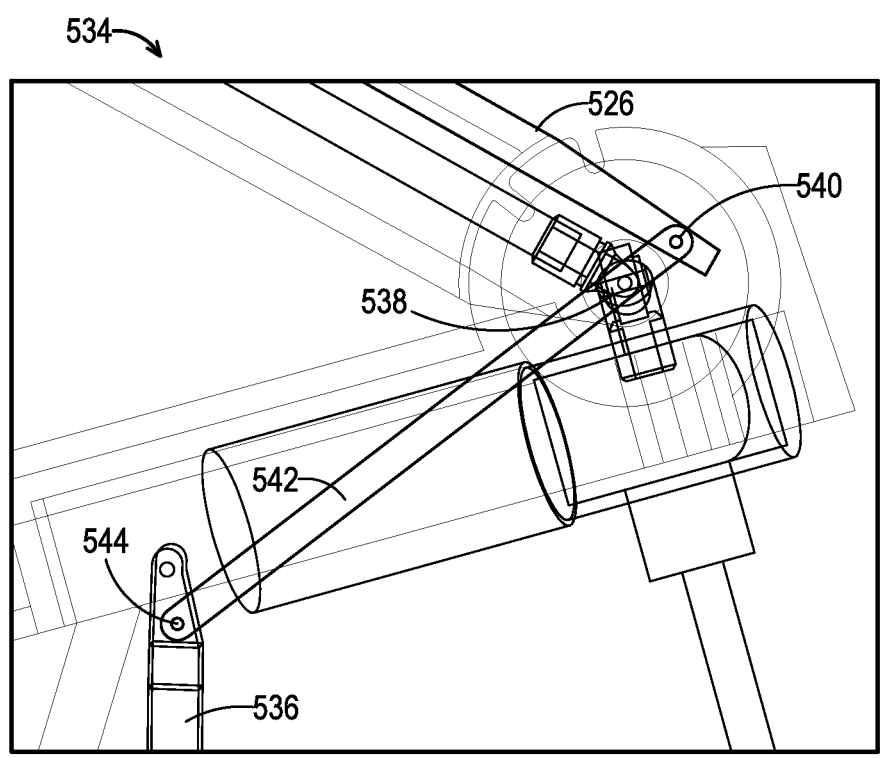
FIG. 13 is another side view of the cam-over mechanism of FIG. 12.

In the example of linkage 534 shown in FIGS. 12-13, a universal joint (i.e., U-joint) 538 is disposed in the handlebar shaft, and a collar housing is disposed around the shaft. This joint allows for hinging motion when transforming between modes, and facilitates the bars turning to steer when needed. In some examples, the steering shaft is disconnected from the power steering unit to eliminate handlebar articulation in autonomous mode.

With continuing reference to FIGS. 12 and 13, linkage 534 comprises a cam-over mechanism, configured to move tilt-lock bar 536 into place and secure the transformation between modes. Specifically, linkage 534 includes a front pivot joint 540 coupling housing 526 to a side link 542, and a rear pivot joint 544 coupling link 542 to tilt-lock bar 536. Front pivot joint 540 is spaced apart from U-joint 538, such that pivoting of the handlebar assembly at U-joint 538 automatically urges the tilt-lock bar forward or backward, as depicted in FIGS. 12 and 13. An identical link and joints may be coupled to the opposite side of the housing and tilt-lock bar. When the tilt-lock bar is pivoted forward, it blocks the chassis from tilting. When the tilt-lock bar is pivoted rearward, it does not affect tilting of the chassis. One or more other suitable methods could be used to secure the transformation, including a secondary latch, servo motor, solenoid, or other physical geometric solution. Alternative and/or additional tilt-locking mechanisms are described further below, with respect to Section D.

D. Illustrative Tilt-Lock Devices

FIGS. 14-24 depict illustrative tilt-lock systems, i.e., systems configured to selectively prevent an autonomous tilting vehicle from tilting, and/or to selectively limit the range of angles over which the vehicle is able to tilt. A tilt-lock system may be convenient for temporarily locking the vehicle in an upright position. The vehicle can be tilt-locked while stationary and/or while in motion. For example, a vehicle may be configured to operate autonomously while tilt-locked, which may include automatic actuation of a steering device to steer the vehicle. Autonomous tilt-locked operation may be suitable for vehicle hailing, fleet management, cargo loading, and/or any other suitable purpose. As another example, the vehicle may be tilt-locked while stationary and/or powered down (e.g., for storage, transport, parking, etc.).

Together with a parking brake, kick stand, and/or other suitable device, a tilt-lock device may form part of a vehicle parking system configured to retain the vehicle in an upright position when parked, such that the vehicle does not tilt, tip, or roll away when parked. Additional aspects of a parking system are described in the next section. In some examples, however, a vehicle includes a tilt-lock device and no other aspects of a parking system.

In some cases, a tilt-lock device is configured to be activated electronically, and possibly autonomously by the vehicle (e.g., by a servo motor and/or other suitable actuator). In some examples, a tilt-lock device and a parking brake are actuated electronically by a servo motor or other suitable actuator configured to drive the tilt lock mechanism into place and to engage a cable to activate the parking brake (e.g., simultaneously or nearly simultaneously).

Alternatively, or additionally, a tilt-lock device may be configured to be actuated manually or semi-automatically by a user. In some examples, a manually actuatable tilt-lock device can be tilt-locked even when the vehicle power supply is shut off, removed, or depleted.

In general, tilt-lock devices described in this section may be used in conjunction with a transforming tiltable vehicle, such as vehicles 100 and 500 described above, or with a non-transforming tiltable vehicle. In examples wherein these tilt-lock devices are used on a transforming tiltable vehicle, they may or may not be independent of the components enabling the vehicle to transform.

Figure 14:
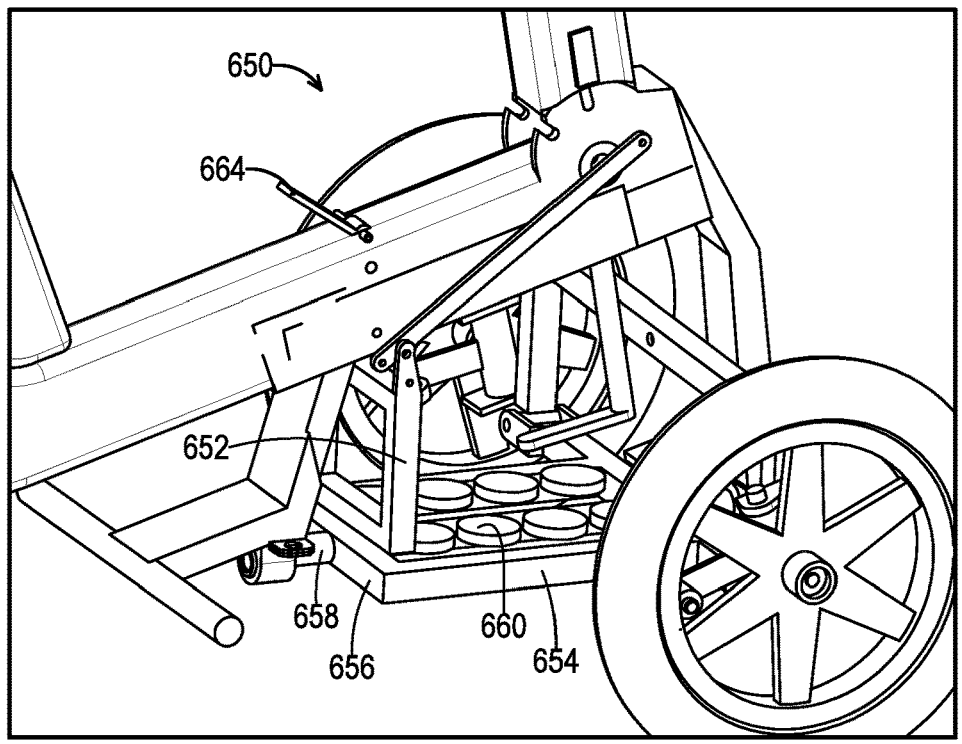
FIG. 14 is an isometric view of an illustrative tilt-lock device in accordance with aspects of the present teachings.
Figure 15:
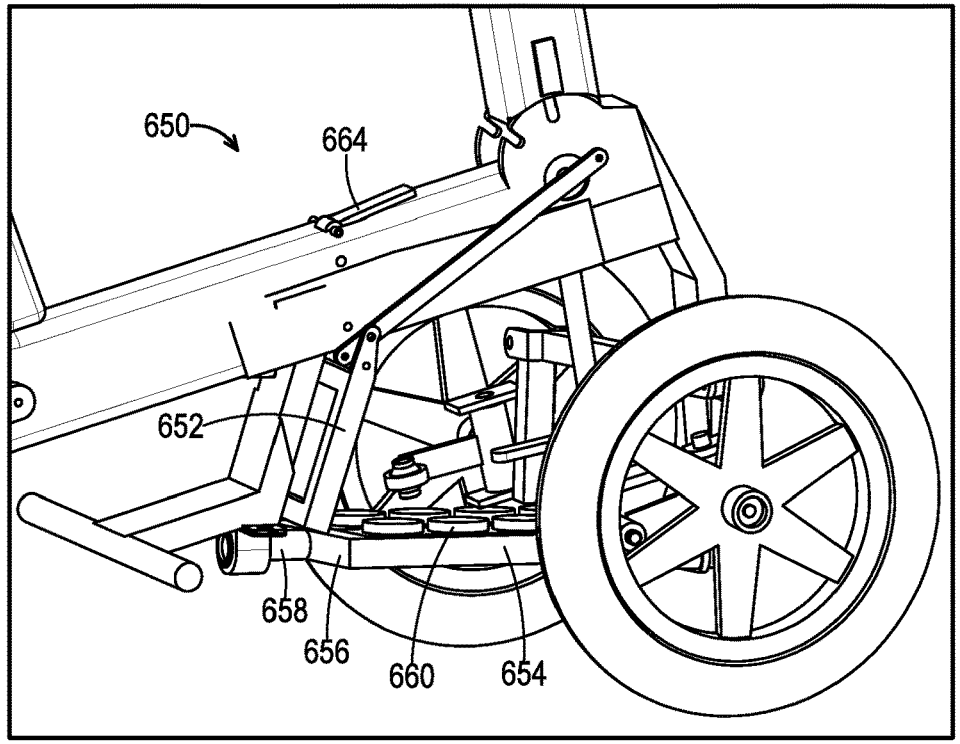
FIG. 15 is another isometric view of the tilt-lock device of FIG. 14.

FIGS. 14-15 depict an illustrative tilt-lock device 650 comprising a bracket 652 disposed underneath the vehicle chassis and pivotably coupled to the chassis. A frame 654 projects rearward from a portion of the tilt linkage (here, from the bottom bar of a four-bar tilt linkage). Frame 654 has a first portion 656 and a second portion 658. Bracket 652 is transitionable between a first position, in which the bracket is positioned adjacent first portion 656, and a second position, in which the bracket is positioned adjacent second portion 658. First portion 656 comprises a bar extending in a lateral direction. When bracket 652 is in the first position, a bottom bar of the bracket is aligned with first portion 656 and is prevented by the first portion from tilting. Accordingly, the first position is a locked position. Second portion 658 has a much smaller lateral extent than bracket 652, such that when the bracket is in the second position, the bracket is not inhibited from tilting. Accordingly, the second position is an unlocked position.

Figure 16:
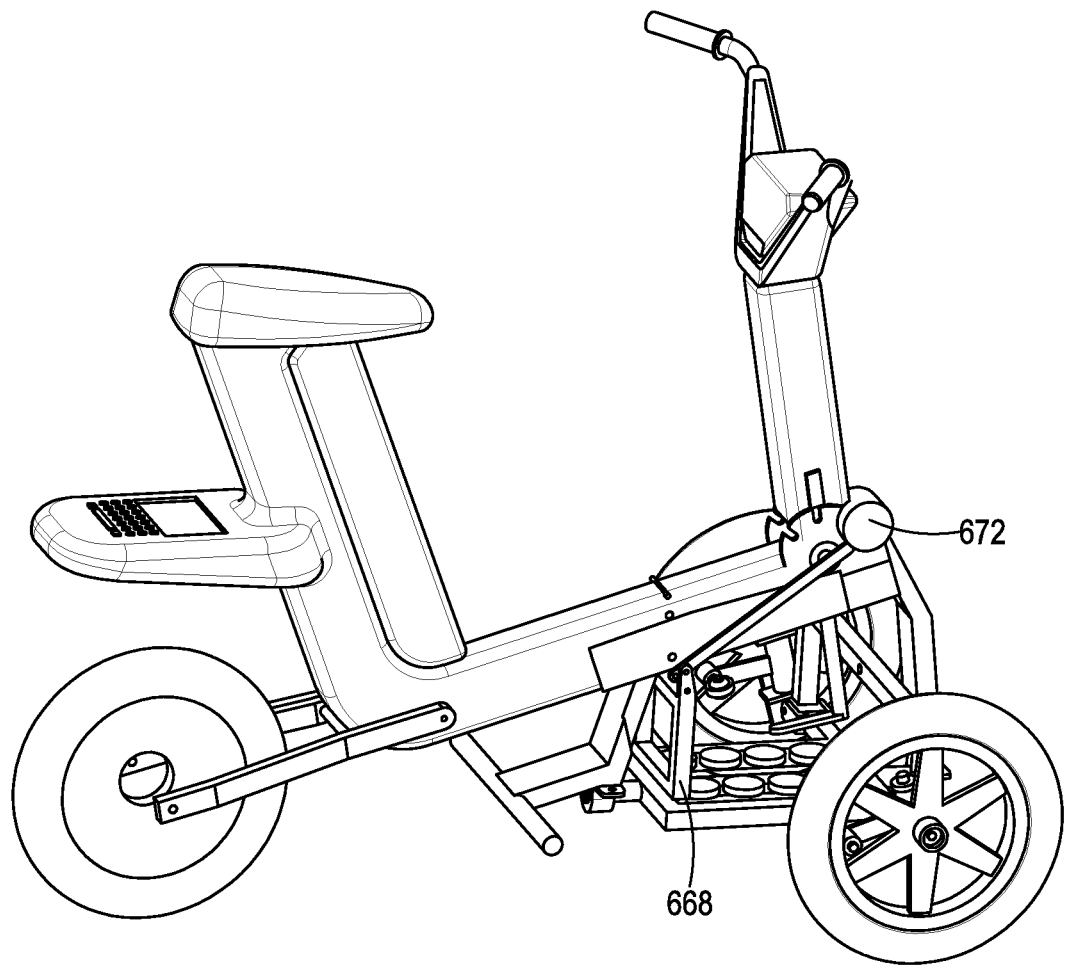
FIG. 16 is an isometric view of a vehicle having an illustrative servo-actuated tilt-lock device, in accordance with aspects of the present teachings.

In the example depicted in FIGS. 14-15, the hinged bracket is selectively engageable using a lever 664 configured to be operated manually by a user. Alternatively or additionally, the bracket may be actuatable by a servo motor that is activated e.g., by a push button, or by a command from the vehicle control system without user intervention. FIG. 16 depicts an example wherein a tilt-lock device comprising a hinged bracket 668 is operatively coupled to a servo motor 672 configured to actuate the bracket. Servo motor 672 may also be used in conjunction with a parking brake as described below.

Figure 17:
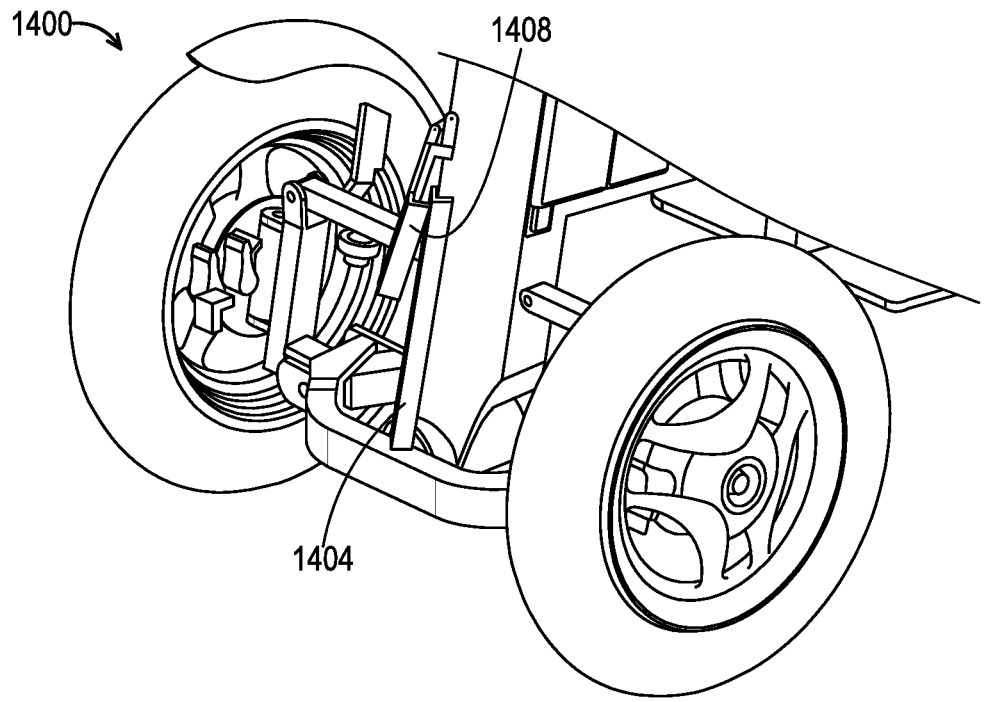
FIG. 17 is a partial isometric view of an illustrative vehicle having a tilt-lock device comprising a pair of nesting plates, in accordance with aspects of the present teachings, depicting the mechanism unlocked.
Figure 18:
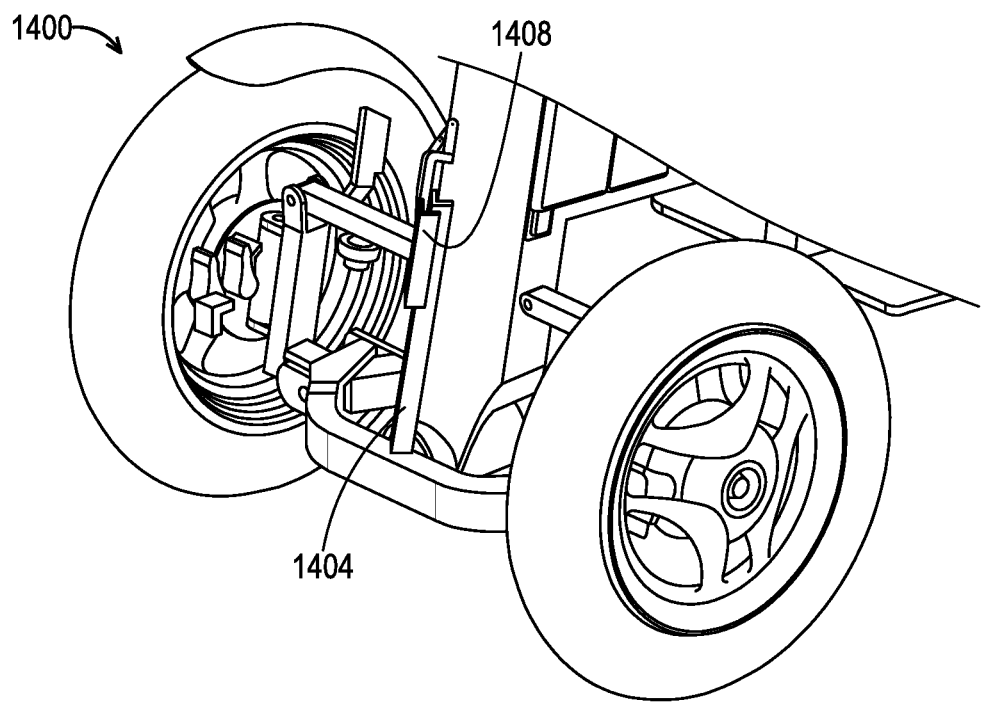
FIG. 18 is another partial isometric view of the vehicle of FIG. 17, depicting the tilt-lock device locked.

FIGS. 17-18 depict an illustrative tilt-lock device 1400 comprising two V-shaped plates (e.g., lengths of angle iron). An inner plate 1404 is rigidly coupled to a lower bar of the vehicle's tilting linkage. Inner plate 1404 is elongate with a V-shaped cross-section and extends upward from a central portion of the linkage bar.

An outer plate 1408, which is also V-shaped, is pivotably coupled to the vehicle chassis. Outer plate 1408 is configured to pivot between a first position wherein inner plate 1404 nests within the outer plate (see FIG. 18), and a second position wherein the outer plate is spaced from the inner plate (see FIG. 17). In the first position, outer plate 1408 retains inner plate 1404, such that the inner plate is prevented from moving laterally relative to the outer plate. In this manner, when outer plate 1408 is in the first position, the outer plate prevents the vehicle chassis from tilting relative to the lower linkage bar. Accordingly, the vehicle is tilt-locked when outer plate 1408 is in the first position. When outer plate 1404 is in the second position, inner plate 1404 is free to move laterally relative to the outer plate, allowing the vehicle chassis to tilt.

Depending on the size and shape of the inner and outer plates, and the size of any gap between the plates in the locked position, tilt-lock device 1400 may completely prevent the vehicle from tilting, or may limit the range of tilt to a small angular span. In some examples, the position of the outer plate may be selected (e.g., by a user or by a controller of the vehicle) to allow a desired range of tilt, including no tilt.

Figure 19:
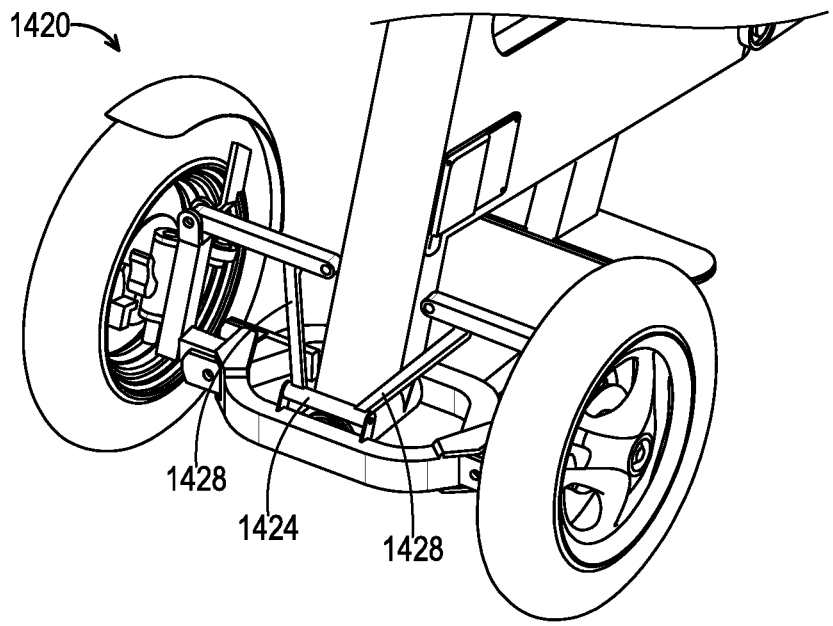
FIG. 19 is a partial isometric view of an illustrative vehicle having a tilt-lock device comprising a pivotable inverted bracket, in accordance with aspects of the present teachings, depicting the mechanism locked.
Figure 20:
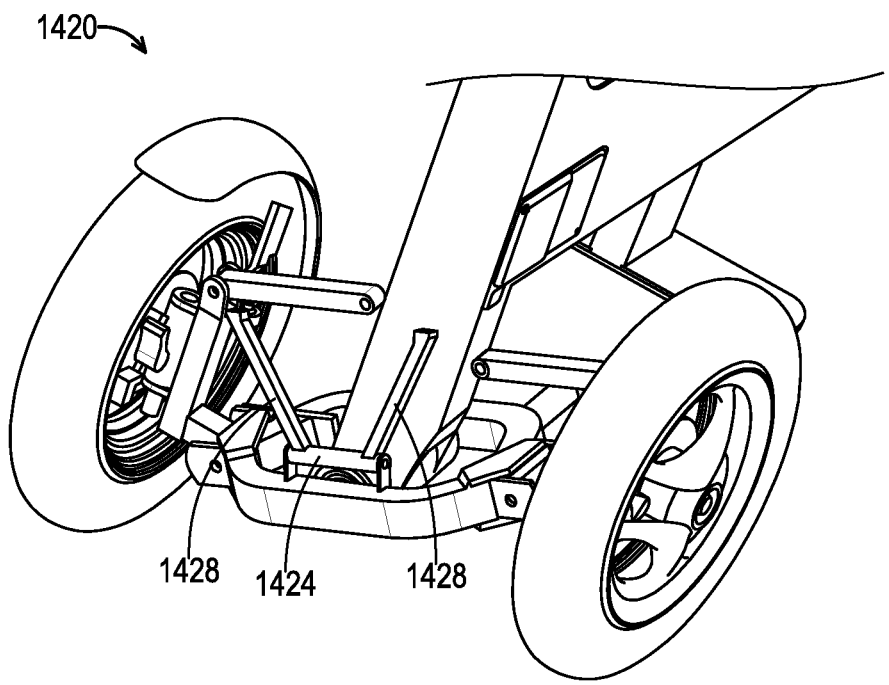
FIG. 20 is another partial isometric view of the vehicle of FIG. 19, depicting the tilt-lock device unlocked.

FIGS. 19-20 depict another illustrative tilt-lock device 1420 comprising a U-shaped bracket 1424 pivotably mounted to a lower bar of the vehicle's tilt linkage. Bracket 1424 has two arms 1428 dimensioned such that, when bracket 1424 is in a locked position, ends of the arms engage a top portion of the tilt linkage in a manner that prevents the chassis from tilting. In the example depicted in FIG. 19, when bracket 1424 is in the tilt-locked position, ends of arms 1428 are jammed underneath respective bars of a split top-bar of a four-bar tilt linkage. This prevents the chassis from tilting by preventing either portion of the split top bar from moving downward. However, in general bracket 1424 may be used in conjunction with any suitable tilt linkage.

FIG. 20 depicts bracket 1424 pivoted away from the top portion of the tilt linkage (e.g., away from the vehicle chassis, in a forward direction). In this position, bracket 1424 is spaced from the top portion of the linkage, such that arms 1428 do not prevent the top portion of the linkage from moving. Accordingly, the vehicle is unlocked (i.e., free to tilt).

In the depicted example, arms 1428 are rigidly coupled together and therefore pivot together when bracket 1424 is pivoted. In other examples, the arms of the bracket may be configured to pivot independently.

Figure 21:
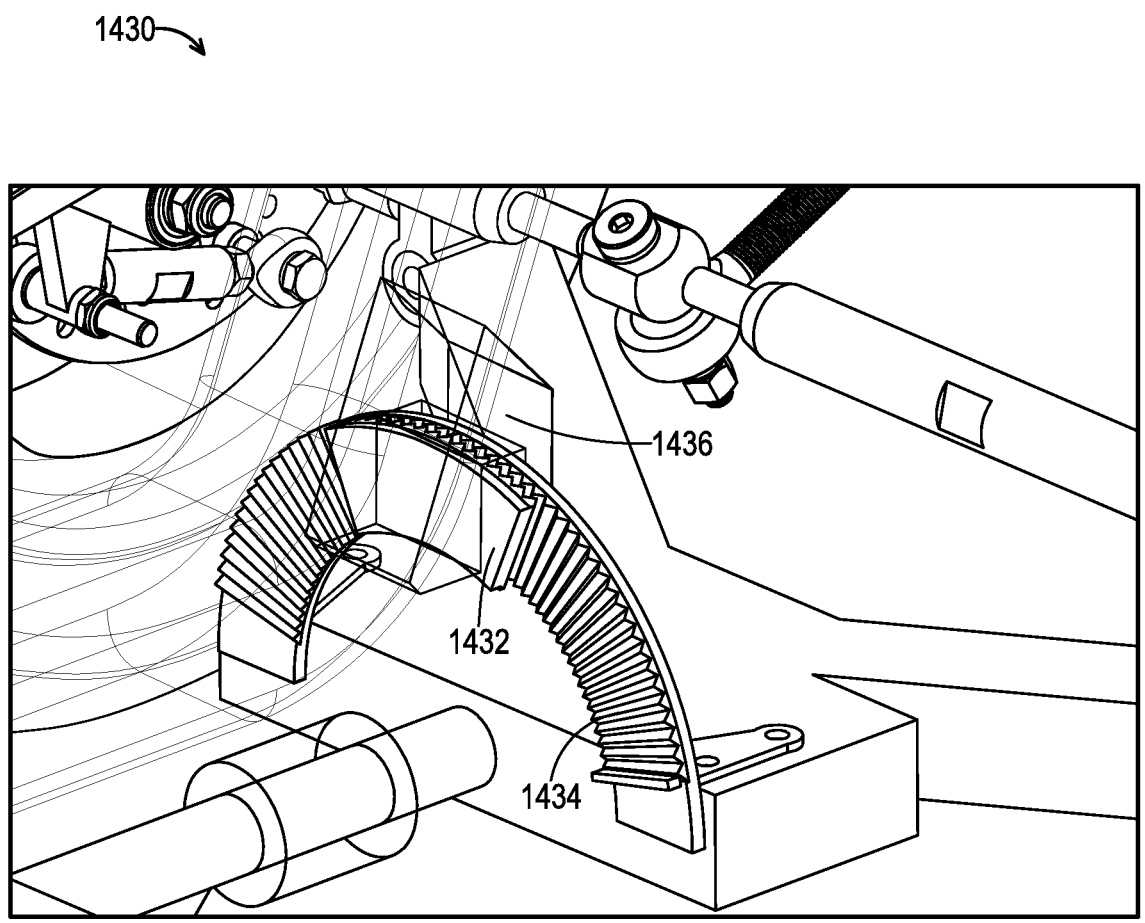
FIG. 21 is a partial isometric view of an illustrative tilt-lock device comprising a knurled caliper and a knurled disc, in accordance with aspects of the present teachings.

FIG. 21 depicts yet another illustrative tilt-lock device 1430. Tilt-lock device 1430 comprises a knurled caliper 1432 configured to mate with a knurled disc 1434. Disc 1434 comprises a partial circle concentrically disposed around the pivoting axis of the chassis. Caliper 1432 is fixed to the tilting chassis (depicted in FIG. 21 as partially transparent), and is positioned such that when the chassis tilts, the caliper is moved along disc 1434. A locking actuator 1436 is configured to selectively clamp caliper 1432 against disc 1434, thereby preventing the caliper from moving relative to the disc and thus tilt-locking the vehicle. When locking actuator 1436 unlocks caliper 1432 from disc 1434 (e.g., by moving the caliper away from the disc such that the complementary knurled surfaces of the caliper and disc are disengaged), it becomes possible for the chassis to tilt.

Tilt-lock device 1430 may be configured to tilt-lock the vehicle at any orientation along disc 1434, or at a subset of angles along the disc. That is, the vehicle chassis may be lockable in an upright position or in a tilted position at a selected tilt angle. This may, e.g., allow the vehicle to be stored or a transported in a locked tilted position.

Figure 22:
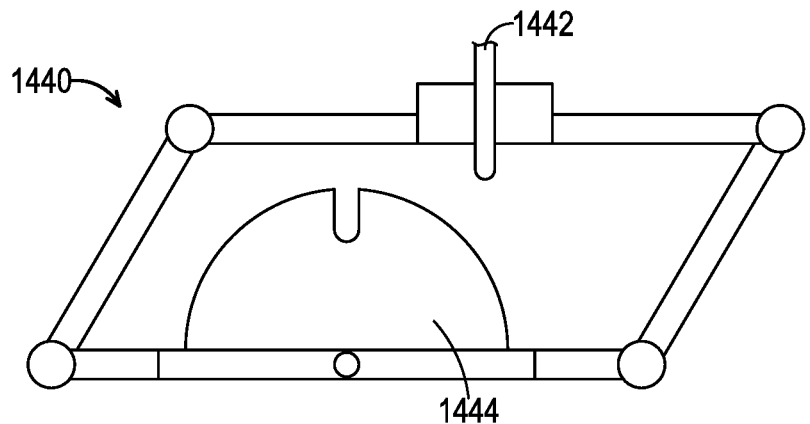
FIG. 22 is a front view of an illustrative tilt-lock device comprising a pin and a slotted disc, in accordance with aspects of the present teachings, depicting the device unlocked and a tilting linkage tilted.
Figure 23:
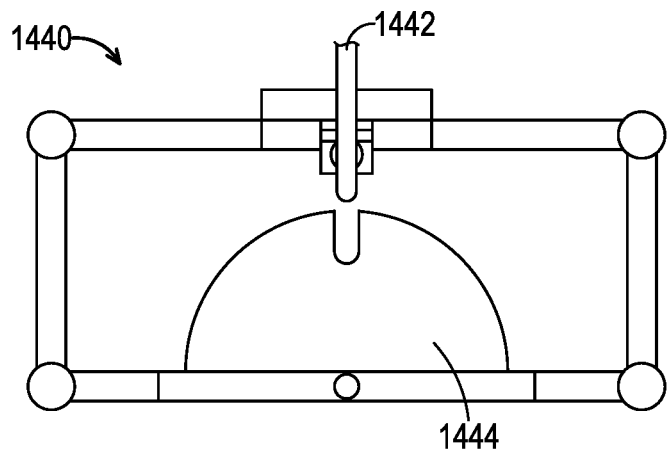
FIG. 23 is another front view of the device of FIG. 22, depicting the linkage upright and the device still unlocked.
Figure 24:
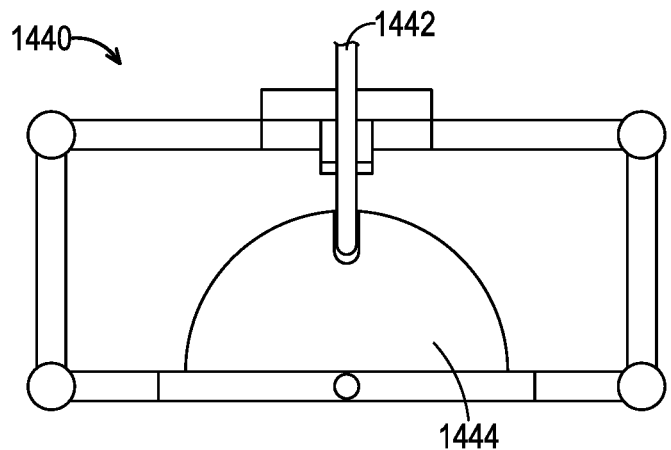
FIG. 24 is yet another front view of the device of FIG. 22, depicting the device locked.

FIGS. 22-24 depict yet another illustrative tilt-lock device 1440 comprising a pin 1442 attached to a top bar of the tilt linkage and a slotted disc 1444 attached to a bottom bar of the tilt linkage. Pin 1442 is selectively transitionable between a locked position wherein the pin is received in the slot of disc 1444, and an unlocked position wherein the pin is spaced from the slot. When the pin is disposed within the slot of the disc, the vehicle chassis is prevented from tilting.

In the depicted example, pin 1442 in the locked position extends downward from the top linkage bar far enough to be received in the slot, and in the unlocked position is retracted away from the bottom bar far enough to avoid the slot. Pin 1442 may be moved between the locked and unlocked positions by a linear actuator, manually by a user, and/or by any other suitable mechanism.

In the depicted example, the disc includes only a single slot disposed over a central portion of the bottom linkage bar. Accordingly, the vehicle is lockable when the pin is disposed over the central portion of the bottom bar, which in this case corresponds to the chassis being in an upright, untilted position. However, in other examples, the disc may additionally or alternatively include slots positioned laterally outboard of center, and/or one or more locking pins may be positioned outboard of center, enabling the vehicle to be locked in a tilted position. In some examples, the pin is fixed to the tilting vehicle chassis rather than to the tilt linkage.

In some examples, an autonomous tilting vehicle can be tilt-locked simply by locking the tilt motor (that is, the motor configured to tilt the vehicle) in a selected position. For example, the tilt motor can be configured to be locked in a position that keeps the vehicle chassis upright when the tilt motor is powered down. Tilt-locking the motor in this manner can allow the vehicle to be restrained against unwanted tilt without the inclusion of dedicated tilt-lock mechanisms, such as those described above. In examples of vehicles that do include dedicated tilt-lock mechanisms, the motor can also be tilt-lockable (e.g., for redundancy). In some examples, the tilt actuator may comprise a motor configured to have maximum torque when the motor is off. In other words, a motor with low or no back-drive capability may function as a primary or supplementary tilt locking device.

E. Illustrative Parking Devices

Figure 25:
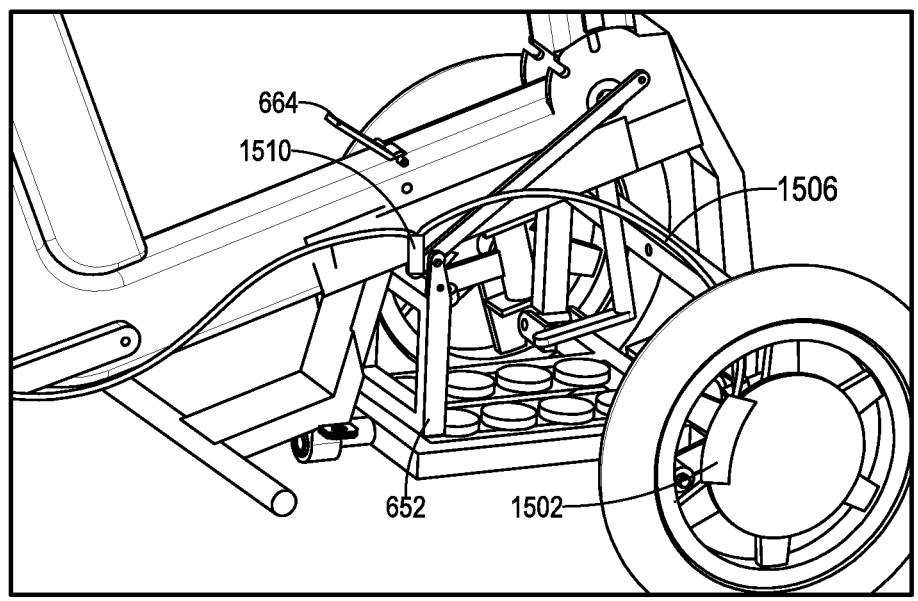
FIG. 25 is a partial isometric view of an illustrative parking brake operatively coupled to a tilt-lock bracket, in accordance with aspects of the present teachings.
Figure 26:
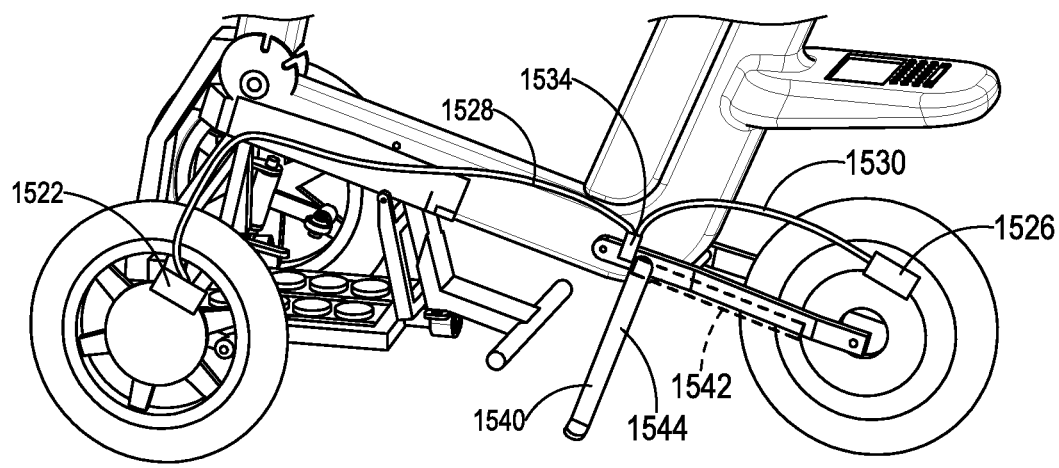
FIG. 26 is a partial isometric view of illustrative front and rear parking brakes operatively coupled to a kickstand, in accordance with aspects of the present teachings.

As shown in FIGS. 25-26, this section describes illustrative parking systems configured to fix a tilting vehicle in a stable position when not in use (e.g., when not being ridden by a user). For example, the parking system may include a tilt-lock device, including one or more of the example tilt-lock devices described above, configured to lock a vehicle in an upright position. Additionally, or alternatively, a parking system may include parking brake(s) configured to brake one or more wheels, kickstand(s) configured to prevent the vehicle from falling over, and/or any other suitable device(s). Vehicle parking devices may be included on a transforming vehicle, such as vehicle 500 described above, and/or on any other suitable vehicle, including non-transforming tilting vehicles.

A parking system of the vehicle may be actuatable mechanically and/or electronically. In some examples, the parking system may be selectively enabled or disabled via a smartphone app (e.g., by an owner of the vehicle, by a user of a vehicle-share service including the vehicle, and so on). For example, a parking brake or tilt-lock device may be configured to engage in response to a communication from the smartphone app indicating that a user has discontinued use of the vehicle. As another example, the parking system may be configured to selectively disable a tilt-lock or other device in response to a communication from the smartphone app indicating that a user wishes to begin using the vehicle (e.g., has paid for use of the vehicle). In some examples, the parking system is additionally or alternatively selectively enabled or disabled using a computer of the vehicle and/or of a docking station associated with the vehicle. Alternatively, or additionally, components of the parking system may be actuatable manually by the user.

FIGS. 25-26 are partial isometric views depicting vehicles having illustrative parking brake systems. In the example depicted in FIG. 25, a front parking brake 1502 is coupled to a front wheel of a tilting vehicle. Additional parking brakes are optionally coupled to the other front wheel and to a rear wheel of the vehicle (not shown). Brake 1502 is coupled by a brake cable 1506 to an actuator 1510, which is coupled to bracket 652 of the vehicle tilt-lock system. Accordingly, actuator 1510 is configured to engage the parking brake when the tilt-lock system is engaged (i.e., when the bracket is pivoted into the locked position, as shown in FIG. 25). For example, actuating the tilt-lock bracket using lever 664 may also engage the parking brake. Other parking brakes of the system (e.g., a rear brake and/or a second front wheel brake) can be coupled to actuator 1510 and/or to another actuator. In some examples, the tilt-lock bracket is selectively decouplable from the parking brake system, so that the vehicle may be tilt-locked without engaging any of the parking brakes. This allows the vehicle to be propelled (e.g., autonomously) while tilt-locked.

In the example depicted in FIG. 26, a front parking brake 1522 and a rear parking brake 1526 are each coupled by respective brake cables 1528, 1530 to an actuator 1534, which is coupled to a kickstand 1540. Kickstand 1540 is transitionable between a first position 1542, wherein the kickstand is oriented along the vehicle chassis and away from the ground, and a second position 1544 wherein the kickstand is oriented away from the chassis toward the ground, such that it helps to support the vehicle in an upright position. Actuator 1534 is configured to engage brakes 1522 and 1526 when the kickstand is engaged (i.e., in second position 1544). A second front-wheel brake may also be coupled to actuator 1534 in this manner.

The parking brakes described above may each comprise any suitable device for braking the wheels, such as drum brake(s), disc brake(s), and/or any other device suitable for at least partially preventing the wheels from rotating, and/or otherwise locking the wheels.

A vehicle can include a parking brake system that is not coupled to a tilt-lock device, kickstand, or any other vehicle component. In other words, the parking brake(s) may be actuatable by a dedicated actuator, which may be actuatable mechanically and/or electronically.

In some examples, a servo and/or electronically controlled latch is configured to prevent the tilt lock and/or parking brake from being released until release is authorized by a communication from an app of the vehicle-sharing system, from the vehicle computer, and/or from another suitable source. In this manner, the latch prevents operation of the vehicle by unauthorized riders and also secures the vehicle in a parked mode. This can help prevent the vehicles from tipping over and/or moving away from the parking location, which may be especially helpful in a vehicle-sharing system wherein users can leave the vehicle in an arbitrary location after use.

F. Illustrative Vehicle Features

As shown in FIGS. 27-33, this section describes illustrative features of example tilting vehicles.

Figure 27:
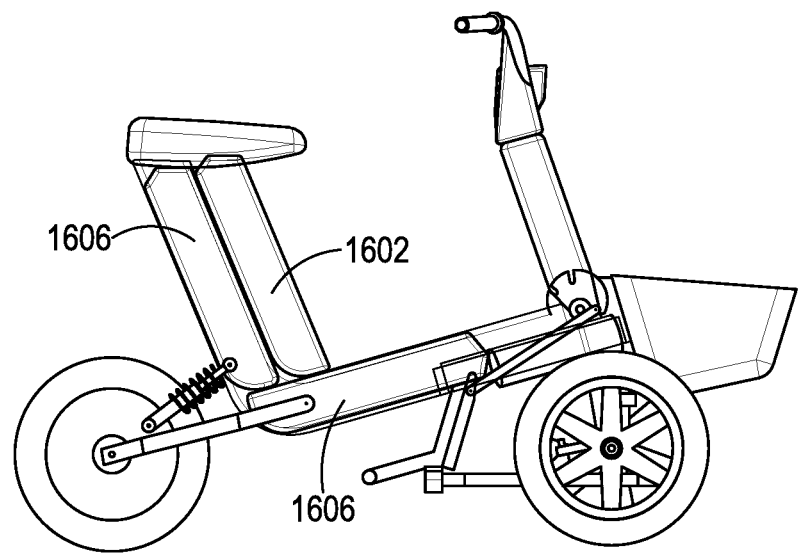
FIG. 27 is a partially transparent side view of a vehicle having illustrative internal battery modules and an external battery module, in accordance with aspects of the present teachings.

FIG. 27 is a side view of an illustrative vehicle having an external battery module 1602 disposed on an outer portion of the vehicle chassis, and a pair of internal battery modules 1606 disposed within portions of the vehicle chassis. A vehicle having external battery module 1602 may comprise an Extended Range ("XR") version of the vehicle. The external module provides a visual cue of the extended range capacity of the vehicle. Although the vehicle depicted in FIG. 27 has both internal and external battery modules, some vehicles have only external modules, and some vehicle have only internal modules. An external or internal module may be disposed in any suitable location on the vehicle (e.g., where the module can provide power to suitable portions of the vehicle without interfering with vehicle operation).

Figure 28:
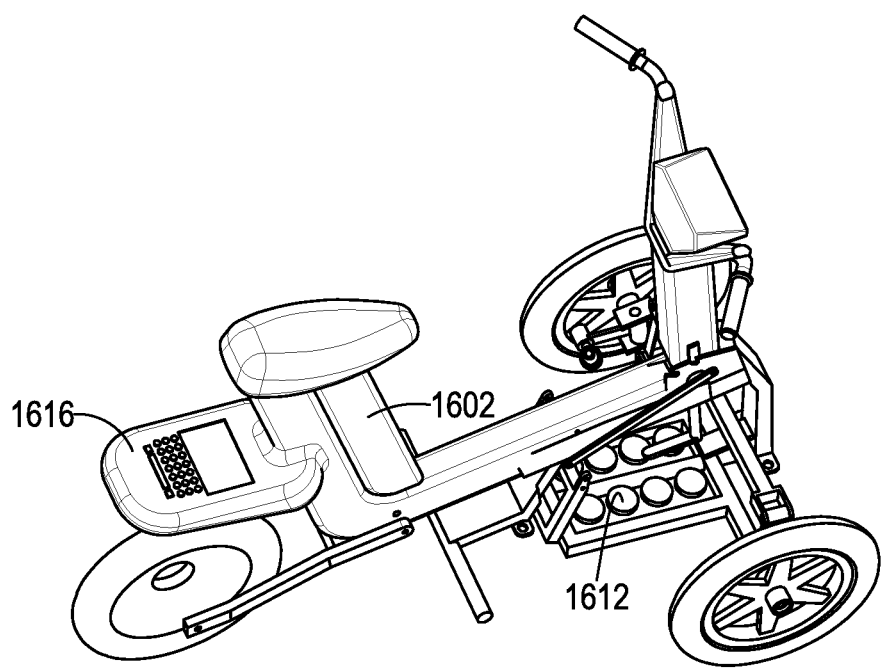
FIG. 28 is an isometric view of a vehicle having an illustrative onboard computer and illustrative wireless charging coils, in accordance with aspects of the present teachings.

FIG. 28 is an isometric view of a vehicle having a plurality of inductive charging coils 1612 configured to facilitate wireless charging of the vehicle battery (e.g., external module 1602 and/or any other suitable battery). For example, a docking station of the vehicle may include a wireless charging pad enabling the vehicle to charge while docked. In some examples, the vehicle may be configured to autonomously drive itself to the charging pad (e.g., from a location where a user has left the vehicle). A location configured to charge the vehicle via coils 1612 may comprise an autonomous recharging zone and/or a hot-spot recharging station. Wireless charging can allow the vehicle to recharge in a partly or fully autonomous manner, without requiring human intervention to swap batteries or connect/disconnect a charging plug.

The vehicle depicted in FIG. 28 further includes an onboard computer 1616 configured to enable and/or support various aspects of the vehicle's functionality. Computer 1616 is configured to be operated by a user of the vehicle (e.g., someone riding and/or maintaining the vehicle, or any other suitable person). For example, computer 1616 may be configured to allow users of a vehicle-share service to rent the vehicle, map a route, communicate with the service, and/or perform any other suitable function. Alternatively, or additionally, computer 1616 may facilitate fleet-management functions. In general, computer 1616 is configured to accept user input (e.g., via a keyboard, buttons, touch-sensitive displays, switches, voice commands, etc.) The computer may additionally or alternatively include device(s) configured to output information to a user, such as a visual display, one or more LEDs, and/or any other suitable device. In some examples, the computer may control and/or receive input from one or more sensors of the vehicle. Computer 1616 may or may not comprise part of the same data processing system as the electronic vehicle control system.

In the depicted example, computer 1616 is mounted behind the rider's seat (e.g., in a fender assembly). Alternatively, or additionally, the computer may be disposed on the vehicle chassis (e.g., between the rider's legs), in a dashboard of the vehicle, and/or in any other suitable location.

Figure 29:
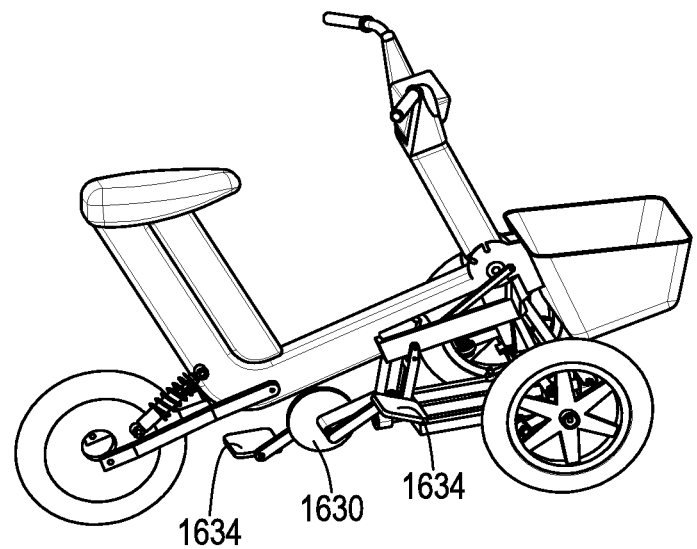
FIG. 29 is an isometric view of a vehicle having an illustrative chain-driven crank drive allowing the vehicle to be pedaled, in accordance with aspects of the present teachings.

FIG. 29 depicts an example vehicle including a crank-driven chain drive 1630. Pedals 1634 coupled to the chain drive allow a user to pedal the vehicle (e.g., like a bicycle) for manual operation. This provides additional flexibility for deployment in different municipalities and regulatory categories. For example, pedals may be used when a power source of the vehicle is low, when a rider wishes to preserve battery charge, in a location in which powered vehicle operation is forbidden or undesirable (e.g., a pedestrian pathway), and so on.

Figure 30:
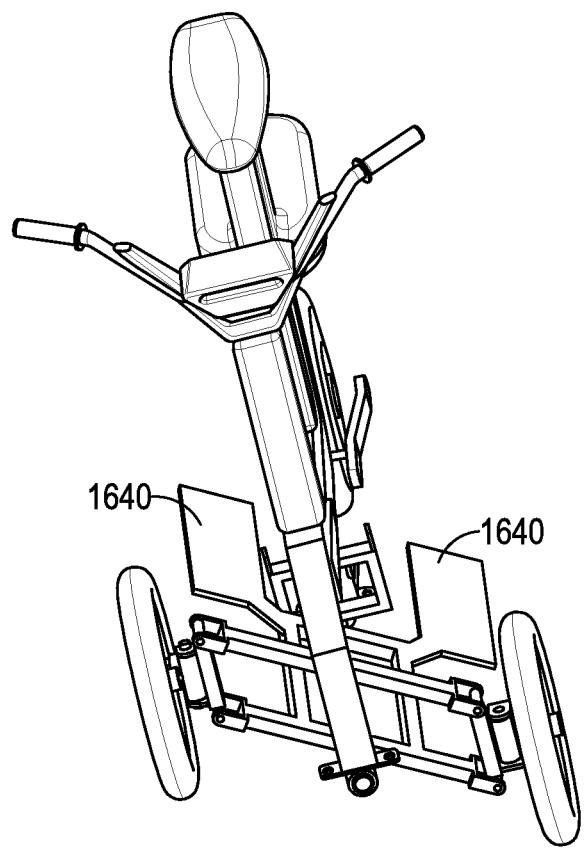
FIG. 30 is an isometric view of an illustrative vehicle having direct foot activation of tilt, in accordance with aspects of the present teachings.

FIG. 30 depicts an example vehicle including a pair of footpads 1640 coupled to a tilting linkage of the vehicle (in this example, to a bottom bar of a four-bar tilting linkage). The footpads help the user to tilt the vehicle chassis (e.g., enabling direct foot activation of tilt).

Figure 31:
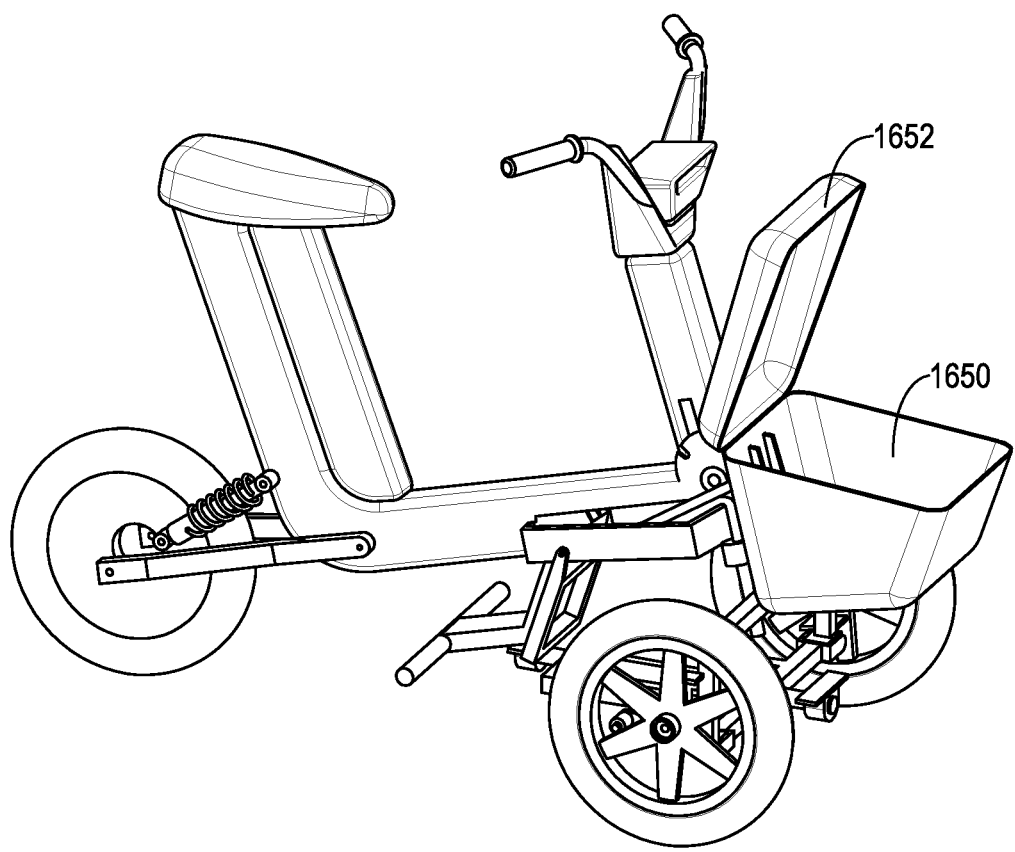
FIG. 31 is an isometric view of a vehicle having an illustrative lockable basket, in accordance with aspects of the present teachings.

FIG. 31 depicts an example vehicle having a basket 1650 coupled to a front end of the chassis. In general a basket may be affixed to any suitable portion of the vehicle. Basket 1650 has a selectively lockable lid 1652 for secure and/or weatherproof transport and/or storage. This may facilitate the vehicle being tasked in autonomous mode as a delivery drone. For example, the lid may be secured automatically or through a code at the beginning of the journey, and may subsequently be opened through a code punched in by recipient at the termination of the trip.

Alternatively, or additionally, the basket may provide storage space for a rider of the vehicle. In some examples, the basket stores a helmet (e.g., a helmet provided by the vehicle-sharing system or by the user, etc.). A basket configured to contain a helmet may be provided in locations where a rider of the vehicle is required (e.g., by law) to wear a helmet, and/or in any other suitable locations. The basket may be configured to remain locked until the user pays for use of the vehicle and/or for use of the basket.

Figure 32:
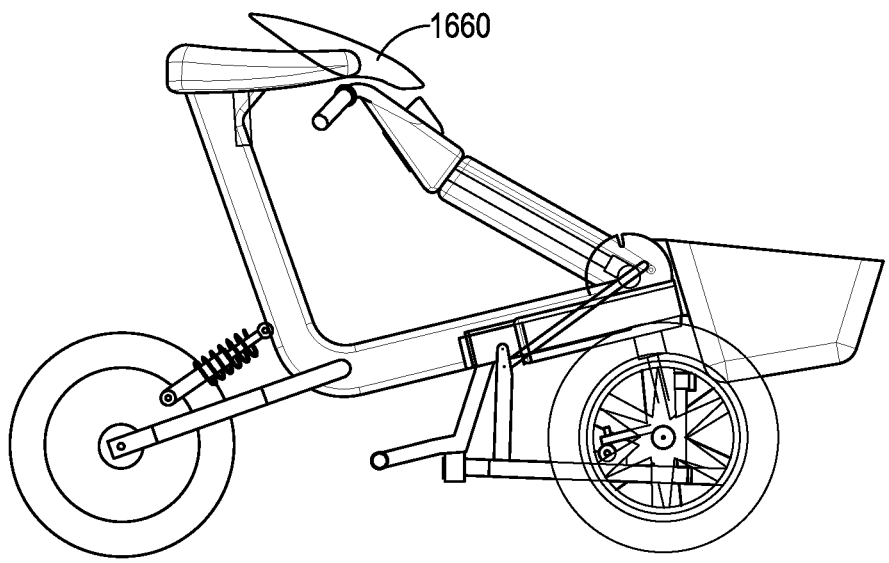
FIG. 32 is a side view of a transforming vehicle having an illustrative windscreen configured to obstruct a seat of the vehicle when the steering column is tilted back, as depicted.
Figure 33:
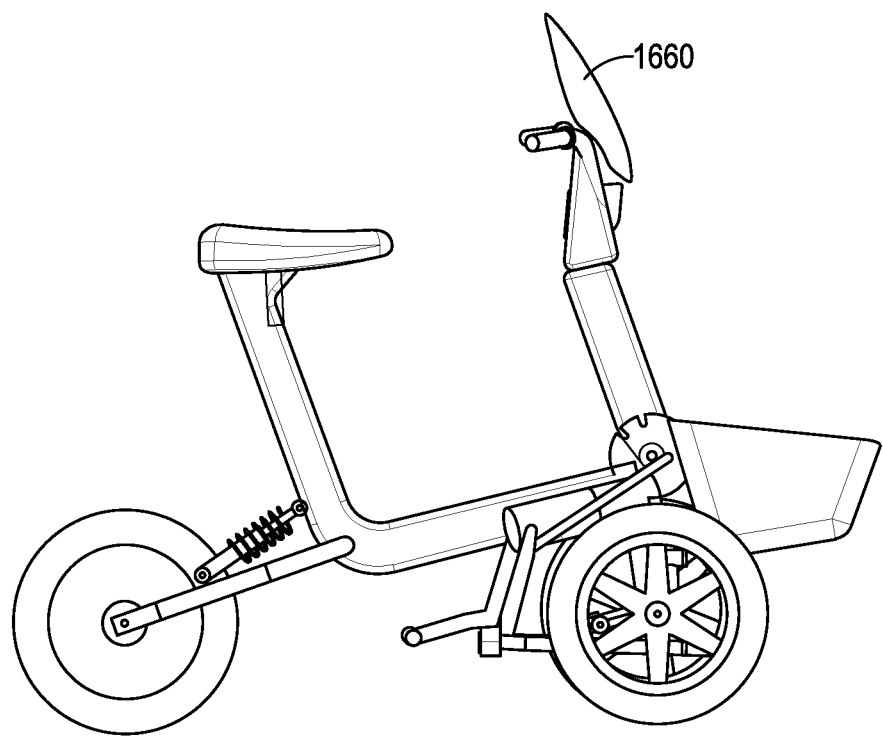
FIG. 33 is another side view of the vehicle of FIG. 32, depicting the steering column in an upright position, such that the vehicle is configured to accommodate a rider.

FIGS. 32-33 depict an illustrative windscreen 1660 attached to handlebars of a vehicle configured to transform between autonomous and manned modes by folding back the steering column. The windscreen is configured to cover the seat of the vehicle when the steering column is folded back (i.e., when the vehicle is in the tilt-locked, autonomous mode), which prevents riders from sitting on the seat during autonomous operation. A windscreen may be included on a vehicle not configured to transform between autonomous and manned modes, or configured to transform between these modes by a different mechanism (i.e., other than folding back the steering column).

The following paragraphs describe, without limitation, illustrative features of a tilting vehicle.

a. Fail-Operational Features

In some examples, the vehicle steering system and/or the vehicle tilting system are configured to "fail-operational," i.e., to continue to function to at least some extent even if certain components fail. A vehicle having fail-operational steering and tilting systems is able to operate (e.g., autonomously, or with a rider) even if one or more individual components or combinations of components (e.g., motor windings, actuators, electronic controllers, sensors, etc.) cease to function.

In some examples, a fail-operational vehicle has, for each control axis, two motors and/or actuators, two controllers, and three sensors. For example, the vehicle tilt system may include two tilt actuators, two tilt controllers, and three tilt sensors. In some examples, the two tilt controllers are each coupled to only a respective one of the tilt actuators; in other examples, the two tilt controllers are coupled to both tilt actuators and are each capable of controlling either actuator. If the vehicle has a steering system, the steering system includes two steering actuators, two steering controllers, and three steering sensors. Similarly to the tilt controllers, the steering controllers may each be coupled to a respective steering actuator or to both steering actuators.

The sets of three sensors (e.g., three tilt sensors and/or three steering sensors) rather than two sensors allow for Triple Modular Redundancy. If only two tilt sensors were included, and one of those sensors failed in a manner that caused it to output faulty data, it could be difficult for the controller to determine which sensor was accurate. With three sensors, however, the faulty sensor is easily identified, because the other two sensors produce similar and/or identical readings. Another advantage of having three of each type of sensor is that, when the sensors are operating normally, their outputs can be combined (e.g., by averaging, error correction algorithms, etc.) for increased precision and/or accuracy. However, in some examples a fail-operational vehicle can include only two of each type of sensor.

As another example of fail-operational functionality, a vehicle having steer motor(s) (or other suitable steering actuators) can be configured to be operable even if the steer motor fails. A steer motor that is configured to be back-driven allows the wheels to tilt when the vehicle chassis is tilted. Accordingly, in the case of failure of the steer motor (or motor controller, or certain aspects of the steering linkage), the vehicle can be operated in a free-to-caster (FTC) mode, wherein the vehicle turns when commanded by the tilt control system, and the back-driven steer motor allows the wheels to be turned. A steer control motor configured to be back-driven in this manner may, for example, include no gearbox between the motor and the steered wheel(s).

In some examples, processing logic of the vehicle is configured to perform certain actions in the event that certain system component(s) fail. For example, in response to failure of the tilting system, the vehicle controller may be programmed to use the steering system (e.g., in an autonomous mode) to steer to a suitable location where the vehicle can safely stop and await repair.

b. Braking

In addition to the parking brake systems described above, braking may be achieved through software via a motor brake, e.g., on the rear wheel. In conjunction with a servo motor actuation on the front brakes, or on all three brakes, the vehicle may have a redundant braking system. For a parking brake, the phase wires of the motor may be crossed either electromechanically or via software controls, effectively locking up the rear wheel without additional mechanization or actuation by rider c. Anti-Lock Braking System (ABS) with Regenerative Braking Vehicles can be designed to incorporate ABS brakes and/or regenerative braking capability using the propulsion system (e.g., a hub motor driving a rear vehicle wheel) for braking power. For example, a braking system having anti-lock and regenerative functionality may be configured to detect nonlinearities in motor deceleration, which indicate traction loss, using external wheel speed sensors (e.g., on non-braked wheels) and/or using commutation sensors of the motor. In response to sensed data indicating loss of traction, the motor controller causes the motor to partially or completely reduce braking torque until traction is regained, and then to reapply regenerative torque.

d. Payload Weight Estimation

In some examples, a vehicle is configured to automatically determine the weight of its payload (e.g., rider(s), passenger(s), and/or cargo carried on or in the vehicle chassis) without inclusion of dedicated sensors such as load cells, strain gauges, and/or the like. Estimated payload weight may be used by processing logic of the vehicle to, e.g., adjust aspects of vehicle control algorithms, adjust vehicle suspension, adjust motor control (e.g, acceleration curves), automatically determine an amount to bill a customer, to identify a problem such as loss of cargo or riders or presence of unexpected objects, and/or for any other suitable purpose. Payload weight estimation can be particularly useful for a lightweight delivery vehicle, for which the payload mass fraction may be significant.

An automatic payload weight estimation method may include determining total vehicle weight (i.e., including the weight of the payload) and subtracting known vehicle curb weight (i.e., the weight of the unloaded vehicle) to estimate payload weight. Total vehicle weight may be determined in any suitable manner. For example, the vehicle controller may be configured to determine the power input to traction motor(s) and determine vehicle acceleration (e.g., by measuring a change in wheel speed, or by directly measuring acceleration using an accelerometer). Based on the input power and acceleration, and accounting for motor efficiency and any other relevant factors, the vehicle controller can estimate the total weight of the vehicle. A known tare weight of the vehicle is subtracted from the total weight to obtain an estimate of the payload weight.

In addition to motor efficiency, other relevant factors that may be accounted for in the payload weight estimation may include wind resistance, rolling resistance, incline of the surface on which the vehicle is traveling (e.g., uphill, downhill, level, etc.), and/or any other suitable factors. Incline of the travel surface may be determined by using an accelerometer or gyroscope of the vehicle to estimate vehicle pitch angle, by using a GPS reading to determine vehicle elevation changes, and/or by using map data (e.g., in conjunction with GPS or other positional data) to identify elevation gradients in the vehicle's location. In some cases, the payload estimation calculations are simplest when the vehicle is traveling on a level surface, and so the estimate of the incline of the travel surface can be used primarily to identify whether the surface is level (indicating that conditions are good for a payload estimation).

Other measurements that may be used in the estimation of total vehicle weight (i.e., in addition to motor input power) may include braking power required to stop the vehicle and/or to decelerate it by a certain amount, and power generated by a regenerative braking system.

Although the foregoing examples describe methods of estimating payload weight without the presence of dedicated weight sensors, dedicated weight sensors may optionally be included.

e. Fleet Tire Pressure Monitoring System (TPMS)

In some examples, one or more wheels of the vehicle may include pneumatic tires. The vehicle may include pressure sensor(s) configured to sense tire pressure, and a controller of the vehicle may be configured to take certain actions if the sensed tire pressure is too low. For example, the vehicle controller may, in response to a low pressure reading, alert a rider, transmit an error signal, slow vehicle speed, and/or attempt to direct the vehicle to a safe location. In some examples, the sensed tire pressure is periodically or continuously telemetered to another location (e.g., a remote computer, another nearby vehicle, a cloud-based data store, and/or any other suitable location). This can allow for convenient monitoring and maintenance of the vehicle tires, particularly for a fleet of autonomous vehicles or vehicle-share vehicles.

f. Replaceable Skid Plate Bottom

A replaceable skid plate may be incorporated on an underside of the vehicle (e.g., on a bottom surface of the chassis). A skid plate tends to protect the chassis and/or other vehicle parts, thereby increasing longevity of the vehicle and/or increasing the time between vehicle repairs. The skid plate may be made of metal, plastic, and/or any other suitable materials. The replaceable skid plate may be attached to the vehicle chassis in an easily releasable manner, facilitating removal of a first skid plate and attachment of a new one (e.g., because the first one has been damaged or needs to be inspected or repaired).

g. Rollover Recovery

Tilting vehicles according to aspects of the present teachings allow for significant articulation of the vehicle linkage(s). In some examples, this articulation can be used to correct the vehicle orientation following an accident or collision. For example, the chassis and/or linkages of the vehicle can be configured to allow for righting the vehicle from a completely inverted state through a combination of coordinated linkage and drivetrain actuation. For a vehicle operating in autonomous mode, such a rollover recovery capability greatly reduces the lost operational time that can otherwise result from minor accidents resulting in rollover, as well as the human time otherwise required to respond to minor accidents.

In some cases, vehicles capable of automatic rollover recovery require no human intervention at all after an accident. For example, an autonomously operating vehicle as described herein may have a relatively small size and weight, such that most accidents involving the vehicles will be minor (i.e., not resulting in significant damage to other vehicles, objects, or people, and not rendering the vehicle inoperable once it has been righted). Accordingly, if the vehicle is capable of restoring itself to an upright position following an accident, no action may need to be taken at the accident site. As another example, a vehicle operating in manned mode may be able to right itself after an accident without intervention from the vehicle operator. This may be convenient for the operator and may demonstrate to the operator that the vehicle is not significantly damaged following the accident.

h. Additional Features

Turn indicators may be located on the ends of handlebars to indicate intended direction of travel to other vehicles. A linkage may be present at the headlight to keep it pointing forward even in autonomous mode when bars are back. In autonomous mode, throttling may be achieved either with a motor directly driving the hand throttle, which may be back-driven when in manned operational mode, or through software directly.

G. Illustrative Systems and Methods Related to Sensor Tilt and Displacement

Figure 34:
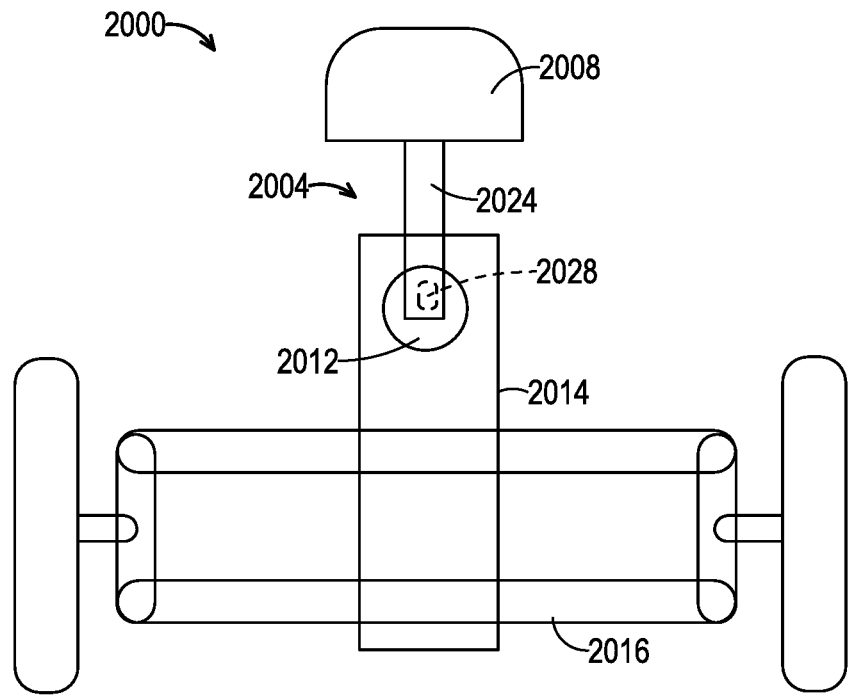
FIG. 34 is a front view of an illustrative vehicle having a sensor module (e.g., a LIDAR sensor) attached to the vehicle chassis by a tilt-compensating mount, in accordance with aspects of the present teachings, depicting the vehicle in an untilted position.
Figure 35:
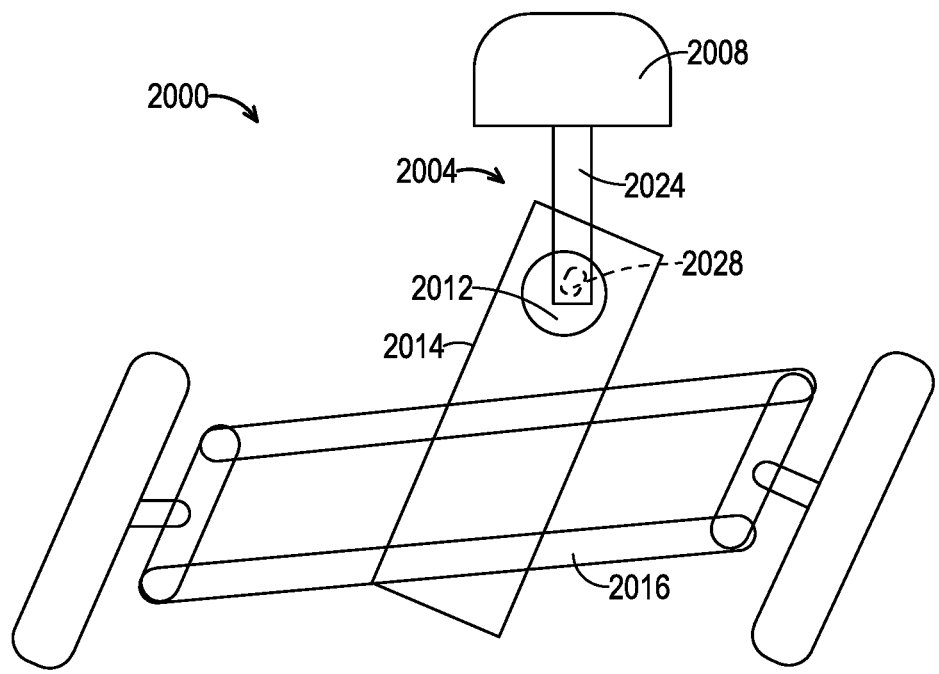
FIG. 35 is another front view of the vehicle of FIG. 34, depicting the vehicle in a tilted position, with the sensor module oriented in an upright position due to the tilt-compensating mount.

With reference to FIGS. 34-35, this section describes illustrative systems and methods relating to accounting for and/or preventing certain effects of tilt and/or lateral displacement of sensors of a tilting autonomous vehicle, such as vehicle 100.

As described above, an autonomous tilting vehicle may include one or more sensors, at least some of which may be mounted to a tilting part of the vehicle chassis. Unless configured otherwise, a sensor mounted to the tilting chassis would be expected to tilt during vehicle operation. For some types of sensors, this tilting can adversely affect data acquired by the sensor (e.g., by interfering with sensor function, by causing the sensed data to be different than data that would be acquired by an untilted sensor, etc.). As an example, an autonomous tilting vehicle may include one or more cameras, radar devices, LIDAR devices, and/or the like mounted to the tilting vehicle frame. Data sensed by these devices may be input to processing logic of the vehicle for navigation, pathfinding, determining information about the vehicle environment, and so on. However, if the sensor is tilted, the sensed data may be difficult for the processing logic to use as intended. For example, a computer-vision algorithm configured to determine a direction of travel for the vehicle may produce inaccurate results if the input data is a tilted image of the scene in front of the vehicle.

An example method for preventing problems associated with tilted sensors is to correct the sensed data based on vehicle tilt, producing corrected data approximating data that would have been acquired by an untilted sensor. For example, processing logic of the vehicle may receive information about vehicle tilt (e.g., tilt angle, angular velocity, and/or the like), and determine, based on the tilt information, a rotational transform and/or other factor(s) or method(s) suitable for correcting and/or compensating the sensed data for vehicle tilt. The processing logic is further configured to correct the sensed data using the determined compensation factor(s) and/or method(s). Correcting the sensed data may include using at least one rotational matrix, machine learning algorithm, and/or any other suitable method for correcting the effect of sensor tilt on the sensed data.

Suitable tilt information usable by the processing logic to determine correction factor(s) and/or method(s) may include information about the setting of one or more tilt actuators; relative positioning of two or more vehicle components; tilt information obtained from an accelerometer, inclinometer, IMU, gyroscope, etc.; and/or the like.

The vehicle processing logic may use any suitable method for selecting sensor data to be corrected. For example, the processing logic may tilt-correct all data sensed by certain sensors, or may tilt-correct data sensed by certain sensors only when vehicle tilt information indicates that the sensor in question is tilted beyond a certain threshold angle. Sensed data may be tilt-corrected automatically when acquired and/or on-demand when the data is accessed by certain control algorithms. Corrected data may be used by vehicle processing logic, recorded in vehicle memory, transmitted to another location, used as training data for machine learning, and/or the like. For example, the corrected sensor output may be used as input to vehicle-control algorithms designed to use data generated by a non-tilting vehicle.

Alternatively, or additionally, one or more sensors may be mounted to the tilting vehicle in a manner that at least partly prevents the physical sensor itself from tilting with the vehicle. For example, one or more sensors may be mounted to the vehicle by a gimbal, linkage, or robotic mechanism configured to allow a gimbaling of the sensors, thereby reducing or eliminating any sensor distortion caused by vehicle tilt. For example, a sensor module may be attached to the vehicle by a gyroscope, such that the sensor module does not tilt along with the vehicle.

In some examples, a sensor module is attached to the vehicle by a mounting system capable of allowing the module to tilt, and the mounting system includes a control system configured to actively correct module tilt such that the module effectively remains untilted. For example, the mounting system can include one or more tilt sensors configured to detect sensor module tilt, and one or more actuators and/or motors configured to adjust the sensor module tilt to restore the sensor module to an upright (e.g., untilted) position. By adjusting sensor module position based on sensed module tilt, the mounting system effectively maintains the sensor module in an untilted position.

In examples including a mounting system configured to reduce or eliminate sensor module tilt, processing logic of the vehicle may optionally still be configured to correct sensed data for module tilt, as described above. Data correction may be helpful in cases where the mounting system does not fully prevent module tilt, where the mounting system has malfunctioned or is inoperable (which can occur if, e.g., the vehicle overturns), and/or in any other suitable situation.

FIGS. 34-35 are front views of an example autonomous tilting vehicle 2000 having an illustrative tilt-compensating mount system 2004 configured to maintain an illustrative sensor module 2008 in a substantially untilted position. Mount system 2004 comprises a gimbal 2012 coupled to a chassis 2014 of vehicle 2000. A sensor support 2024 couples module 2008 to gimbal 2012 in a manner that prevents the sensor support and the module from tilting about the vehicle roll axis. In other examples, sensor support 2024 is omitted, and sensor module 2008 is directly connected to gimbal.

Tilt-compensating mount system 2004 optionally includes a tilt detector 2028 disposed on gimbal 2012. In other examples, tilt detector 2028 may be disposed on the sensor module or sensor support. Tilt detector 2028 senses a tilt of sensor support 2024, which corresponds to a tilt of module 2008 due to the rigid connection between support 2024 and module 2008. Based on the sensed tilt of the module, an actuator of gimbal 2012 rotates support 2024 such that module 2008 is positioned upright (i.e., substantially untilted). In other examples, an actuator of gimbal 2012 may be in communication with the tilt actuator (or associated controller) of the vehicle tilt linkage, and the gimbal actuator rotates support 2024 to prevent tilting based on the commanded vehicle tilt.

FIG. 34 depicts vehicle 2000 in a substantially upright position, with module 2008 also in an upright position. In FIG. 35, vehicle 2000 has tilted (e.g., to effect a turn), but module 2008 is maintained in an upright position by tilt-compensating mount system 2004.

As shown in FIG. 35, although module 2008 is maintained by mount system 2004 in an upright position, the tilting of vehicle chassis 2014 laterally displaces the module relative to the vehicle chassis and wheel linkage. This lateral displacement also tends to occur for sensor modules not attached to the chassis by mount system 2004 or similar (that is, in examples wherein sensor modules do tilt along with the vehicle chassis). The lateral displacement can, in some cases, impact the use of data sensed by sensor module 2008 (e.g., in algorithms of processing logic of the vehicle).

For example, in some cases module 2008 includes a LIDAR module used by navigation and/or computer-vision algorithms, and these algorithms may expect the LIDAR data to correspond to a LIDAR module positioned at a lateral center line of the vehicle. The lateral displacement of the sensor module due to vehicle tilt therefore tends to cause the algorithms to fail.

Accordingly, in some examples, lateral displacement of the sensor module due to vehicle tilt is corrected after data acquisition by processing logic of the vehicle, in a manner similar to the tilt correction of sensed data described above. For example, a lateral-displacement sensor may be disposed on sensor module 2008 (and/or on any other suitable part of the vehicle) and configured to detect lateral displacement of sensor module 2008. Processing logic of the vehicle may use the sensed lateral-displacement information to correct and/or compensate for the lateral displacement of the sensor module. For example, in some cases it is possible to correct the output of sensor module 2008 to approximate output of a sensor that has not been displaced (i.e., a sensor positioned at a lateral center of the vehicle). Alternatively, or additionally, algorithms of the vehicle processing logic may be configured to adjust their calculations to account for the displacement of the sensor from lateral center.

In some examples, hardware of the vehicle is configured to prevent and/or reduce lateral displacement of the sensor module. A hardware solution for lateral displacement may replace or be used in conjunction with the data correction approach described above.

H. Illustrative Method for Vehicle-Sharing

This section describes steps of an illustrative method 3000 for providing a vehicle-share session using a tiltable vehicle. Aspects of vehicles described above may be utilized in the method steps described below. Where appropriate, reference may be made to components and systems that may be used in carrying out each step. These references are for illustration, and are not intended to limit the possible ways of carrying out any particular step of the method.

Figure 36:
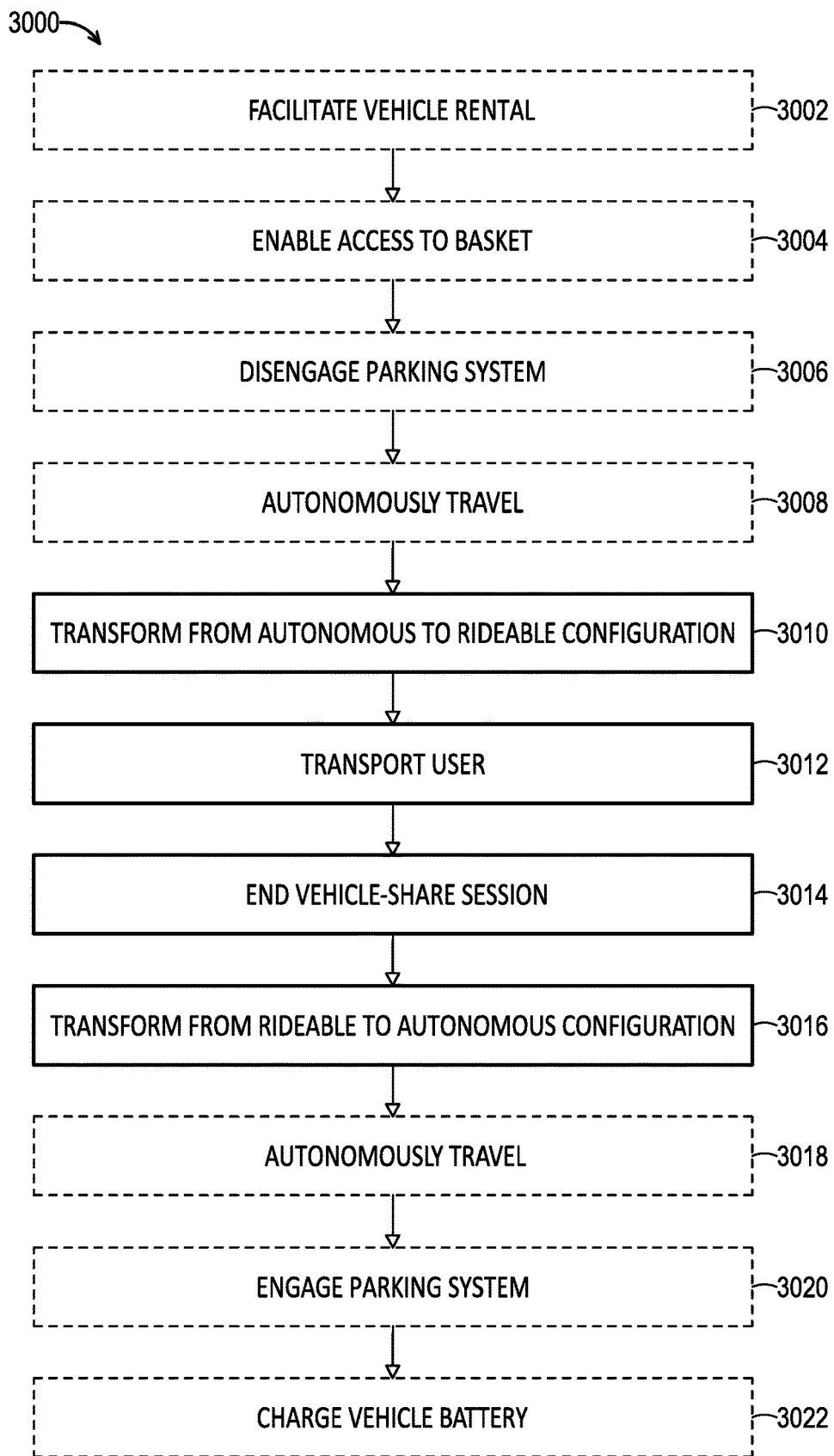
FIG. 36 is a flow chart depicting steps of an illustrative method for vehicle-sharing, in accordance with aspects of the present teachings.

FIG. 36 is a flowchart illustrating steps performed in an illustrative method, and may not recite the complete process or all steps of the method. Although various steps of method 3000 are described below and depicted in FIG. 36, the steps need not necessarily all be performed, and in some cases may be performed simultaneously or in a different order than the order shown.

Step 3002 of method 3000 optionally includes facilitating rental of the vehicle by a user (e.g., from a vehicle-sharing service providing vehicles available for short-term or long-term rental). Prior to rental, the vehicle may be disposed at a docking location, where vehicles of the service are returned after use. Alternatively, the vehicle may be disposed at an arbitrary location where it was left by a previous user or an operator of the vehicle-share service. Facilitating rental of the vehicle may include carrying out a rental transaction by a data processing system (e.g., a computer, tablet, and/or the like) attached to the vehicle. For example, the vehicle computer may be configured to accept a credit card payment from the user, to access and charge a user account with the vehicle-sharing service, and/or perform any other functions suitable for facilitating the user's rental of the vehicle. Facilitating the rental may further include communicating information about the transaction from the vehicle computer to a remote server over a network. In other examples, however, the rental transaction is implemented by a computer not attached to the vehicle. For example, the transaction could be facilitated by a computer attached to the vehicle docking station, or by the user's mobile device.

Step 3004 of method 3000 optionally includes enabling access to a basket or other closable compartment mounted on the vehicle. For example, a lid of the basket may be locked and configured to unlock in response to successful completion of the rental transaction in step 3002. In other words, the basket may be unavailable for use until the vehicle is rented by the user.

In some examples, the basket contains a helmet wearable by the user (e.g., after the user has rented the vehicle, thereby causing the basket to unlock). Accordingly, in such an example, step 3004 includes providing a helmet to the user. Providing the helmet may improve user safety and/or comply with local regulations. This may be especially convenient in cases where the user has rented the vehicle from a vehicle-share service, because a user in this situation may not be carrying a helmet with them at the time they rent the vehicle.

Step 3006 of method 3000 optionally includes disengaging one or more aspects of a vehicle parking system. For example, disengaging vehicle parking device(s) may include raising a kickstand, disengaging a parking brake configured to lock one or more vehicle wheels, and/or disengaging a tilt-lock device configured to prevent the vehicle chassis from tilting about a roll axis. These features may be configured to disengage in response to user actuation of one or more buttons, levers, and/or other suitable electromechanical devices. Alternatively, or additionally, one or more parking features may be configured to automatically disengage in response to a signal from the onboard indicating successful rental of the vehicle. As yet another example, the onboard computer may be configured to allow the user to input an instruction to disengage the parking device(s), the parking device(s) being configured to automatically disengage in response to a signal from the onboard computer.

At step 3008, method 3000 optionally includes the vehicle autonomously traveling at least a short distance (e.g., to the user). For example, the vehicle may be disposed in a docking location comprising a shed, stall, or other suitable enclosure or partial enclosure, and the vehicle may be configured to automatically exit the enclosure. In steps wherein the vehicle is mechanically transformable between a first configuration, wherein the vehicle operates autonomously, and a second configuration, wherein the vehicle is operable by a rider, the vehicle is in the first configuration at step 3008. In general, step 3008 is performed after the parking system is disengaged in step 3006, if applicable. However, in some cases, aspects of the parking system are linked to parts of the vehicle configured to transform between manned and autonomous configurations. For example, a tilt-lock device of the parking system may be coupled to a mechanism configured to lock the handlebars in a folded position. In these cases, the steps of disengaging the parking system and autonomously traveling to the user may be performed in any sensible order. Step 3008 includes providing power to a motor of the vehicle. If step 3008 is not performed, providing power to the motor can occur at any other suitable step.

Step 3010 of method 3000 includes the vehicle transforming from an autonomous configuration to a manned (i.e., rideable) configuration. For example, the vehicle may be configured to assume the manned configuration in response to a user manually pivoting the handlebars forward. As another example, the vehicle may be configured to automatically assume the rideable configuration in response to a user command input to the onboard computer, and/or in response to completion of the rental transaction. For example, the vehicle may be biased toward the manned configuration, with a latch retaining the vehicle in the autonomous configuration (e.g., retaining the handlebars in a folded position), and the latch may be configured to disengage automatically in response to a suitable signal.

In some examples, transforming to the manned configuration includes allowing the user to access a seat of the vehicle. For example, the vehicle handlebars may be folded back in the autonomous configuration such that a windshield of the vehicle obstructs the seat, preventing the user from sitting. Transforming to the manned configuration moves the windshield away from the seat, allowing access to the seat.

Step 3012 of method 3000 includes transporting the user. Transporting the user includes automatically tilting a chassis of the vehicle and optionally actively steering wheels of the vehicle to guide the vehicle down a selected path while maintaining a median plane of the vehicle chassis in alignment with a net force vector resulting from gravity and centrifugal force (if any).

Step 3014 of method 3000 includes ending the vehicle-share session (i.e., terminating rental of the vehicle). Ending the session includes disabling and/or limiting power to the vehicle motor, and may include gradually slowing the vehicle to a stop. In some cases, ending the session includes indicating to the user (e.g., via a display of the onboard computer and/or any other suitable audible and/or visual signal) that the session has ended.

The session may end in response to a command from the user (e.g., via a mobile device, an onboard computer, and/or any other suitable interface), may automatically end after a predetermined time, and/or may automatically end in response to any other suitable criteria. For example, the session may end if the vehicle has traveled outside a predetermined distance, into a forbidden location, and/or the like.

Step 3016 of method 3000 includes the vehicle transforming from a rideable configuration to an autonomous configuration, either automatically or due to manual user actuation.

Step 3018 of method 3000 optionally includes the vehicle traveling autonomously at least a short distance. For example, the vehicle may be configured to travel autonomously to a nearby docking station, and/or to automatically enter an enclosure.

Step 3020 of method 3000 optionally includes engaging at least one parking device of the vehicle, either automatically or through user action.

Step 3022 of method 3000 optionally includes charging a battery of the vehicle at a docking station. For example, the vehicle may include wireless charging coils, and the dock may include a wireless charging transmitter configured to wireless charge the vehicle battery.

I. Illustrative Method for Using a Transforming Tiltable Vehicle

This section describes steps of an illustrative method 3100 for providing a vehicle-share session using a tiltable vehicle. Aspects of vehicles described above may be utilized in the method steps described below. Where appropriate, reference may be made to components and systems that may be used in carrying out each step. These references are for illustration, and are not intended to limit the possible ways of carrying out any particular step of the method.

Figure 37:
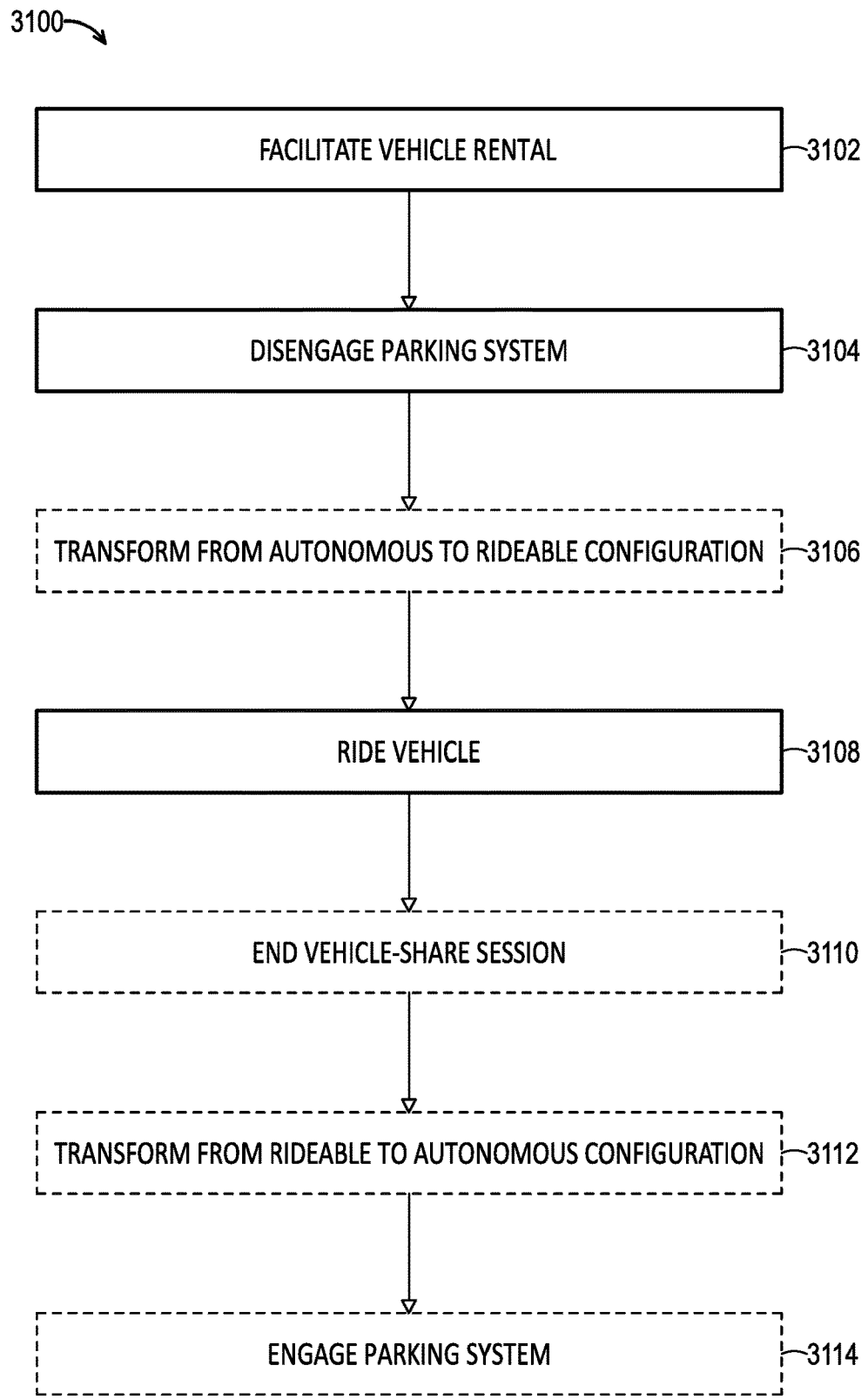
FIG. 37 is a flow chart depicting steps of an illustrative method for using a tilting transformable vehicle, in accordance with aspects of the present teachings.

FIG. 37 is a flowchart illustrating steps performed in an illustrative method, and may not recite the complete process or all steps of the method. Although various steps of method 3100 are described below and depicted in FIG. 38, the steps need not necessarily all be performed, and in some cases may be performed simultaneously or in a different order than the order shown.

Step 3102 of method 3100 optionally includes renting a vehicle from a vehicle-sharing service. In some cases, the rental may be carried out using a computer onboard the vehicle.

Step 3104 of method 3100 optionally includes disengaging a parking system of the vehicle. For example, step 3104 may include raising a kickstand, unlocking a tilt-lock mechanism, and/or the like. In some examples, the vehicle automatically disengages at least some parts of the parking system (e.g., once the vehicle has been rented and the vehicle-sharing session has begun).

Step 3106 of method 3100 optionally includes transforming the vehicle from an autonomous configuration to a rideable configuration. For example, step 3106 may include tilting the vehicle handlebars forward, which may also automatically disengage a tilt-lock device of the vehicle. In other examples, the vehicle may transform to the rideable configuration automatically, without user intervention.

Step 3108 of method 3100 includes riding the vehicle in its rideable configuration.

Step 3110 of method 3100 optionally includes causing the vehicle-share session to end, e.g., by inputting a command to an onboard vehicle computer, into an app running on the user's mobile device, and/or in any other suitable manner. In some examples, the session ends automatically (e.g., after a prepaid amount of time has elapsed), so the user does not need to cause the session to end.

Step 3112 optionally includes transforming the vehicle from the rideable configuration to the autonomous configuration (e.g., by tilting the handlebars forward). In some examples, the transformation occurs automatically.

Step 3114 optionally includes engaging a parking system of the vehicle, such as a tilt-lock device, a kick stand, a parking brake, and/or any other suitable device. In some examples, one or more parking devices engage automatically.

J. Illustrative Data Processing System

Figure 38:
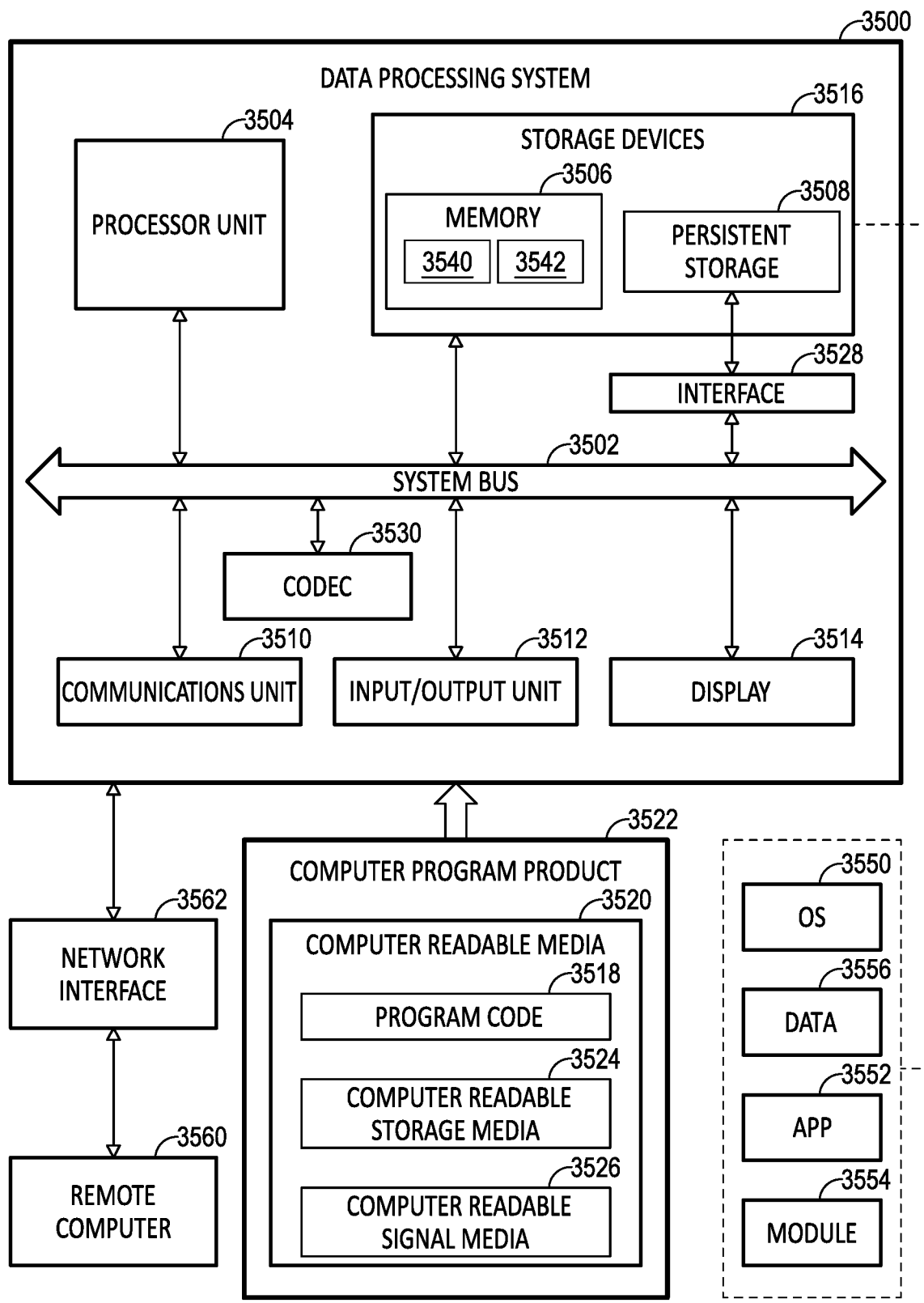
FIG. 38 is a schematic diagram depicting an illustrative data processing system in accordance with aspects of the present teachings.

As shown in FIG. 38, this example describes a data processing system 3500 (also referred to as a computer, computing system, and/or computer system) in accordance with aspects of the present disclosure. In this example, data processing system 3500 is an illustrative data processing system suitable for implementing aspects of the tilting vehicle. More specifically, in some examples, devices that are embodiments of data processing systems (e.g., smartphones, tablets, personal computers) may comprise one or more electronic controllers of the vehicle, an onboard computer provided on the vehicle for user interaction (e.g., to facilitate use of the vehicle in a vehicle-sharing service), a fleet-management computer remote from the vehicle, and so on. For example, aspects of the vehicle's electronic controller(s) for tilt, steering, and/or motor control may be implemented using examples of data processing systems.

In this illustrative example, data processing system 3500 includes a system bus 3502 (also referred to as communications framework). System bus 3502 may provide communications between a processor unit 3504 (also referred to as a processor or processors), a memory 3506, a persistent storage 3508, a communications unit 3510, an input/output (I/O) unit 3512, a codec 3530, and/or a display 3514. Memory 3506, persistent storage 3508, communications unit 3510, input/output (I/O) unit 3512, display 3514, and codec 3530 are examples of resources that may be accessible by processor unit 3504 via system bus 3502.

Processor unit 3504 serves to run instructions that may be loaded into memory 3506. Processor unit 3504 may comprise a number of processors, a multi-processor core, and/or a particular type of processor or processors (e.g., a central processing unit (CPU), graphics processing unit (GPU), etc.), depending on the particular implementation. Further, processor unit 3504 may be implemented using a number of heterogeneous processor systems in which a main processor is present with secondary processors on a single chip. As another illustrative example, processor unit 3504 may be a symmetric multi-processor system containing multiple processors of the same type.

Memory 3506 and persistent storage 3508 are examples of storage devices 3516. A storage device may include any suitable hardware capable of storing information (e.g., digital information), such as data, program code in functional form, and/or other suitable information, either on a temporary basis or a permanent basis.

Storage devices 3516 also may be referred to as computer-readable storage devices or computer-readable media. Memory 3506 may include a volatile storage memory 3540 and a non-volatile memory 3542. In some examples, a basic input/output system (BIOS), containing the basic routines to transfer information between elements within the data processing system 3500, such as during start-up, may be stored in non-volatile memory 3542. Persistent storage 3508 may take various forms, depending on the particular implementation.

Persistent storage 3508 may contain one or more components or devices. For example, persistent storage 3508 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 3508 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 3508 to system bus 3502, a removable or non-removable interface is typically used, such as interface 3528.

Input/output (I/O) unit 3512 allows for input and output of data with other devices that may be connected to data processing system 3500 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 3504 through system bus 3502 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 3500 and to output information from data processing system 3500 to an output device. One or more output adapters may be provided for certain output devices (e.g., monitors, speakers, and printers, among others) which require special adapters. Suitable output adapters may include, e.g. video and sound cards that provide a means of connection between the output device and system bus 3502. Other devices and/or systems of devices may provide both input and output capabilities, such as remote computer(s) 3560. Display 3514 may include any suitable human-machine interface or other mechanism configured to display information to a user, e.g., a CRT, LED, or LCD monitor or screen, etc.

Communications unit 3510 refers to any suitable hardware and/or software employed to provide for communications with other data processing systems or devices. While communication unit 3510 is shown inside data processing system 3500, it may in some examples be at least partially external to data processing system 3500. Communications unit 3510 may include internal and external technologies, e.g., modems (including regular telephone grade modems, cable modems, and DSL modems), ISDN adapters, and/or wired and wireless Ethernet cards, hubs, routers, etc. Data processing system 3500 may operate in a networked environment, using logical connections to one or more remote computers 3560. A remote computer(s) 3560 may include a personal computer (PC), a server, a router, a network PC, a workstation, a microprocessor-based appliance, a peer device, a smart phone, a tablet, another network note, and/or the like. Remote computer(s) 3560 typically include many of the elements described relative to data processing system 3500. Remote computer(s) 3560 may be logically connected to data processing system 3500 through a network interface 3562 which is connected to data processing system 3500 via communications unit 3510. Network interface 3562 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 3530 may include an encoder, a decoder, or both, comprising hardware, software, or a combination of hardware and software. Codec 3530 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 3530 is depicted as a separate component, codec 3530 may be contained or implemented in memory, e.g., non-volatile memory 3542.

Non-volatile memory 3542 may include read only memory (ROM), programmable ROM (PROM), electrically programmable ROM (EPROM), electrically erasable programmable ROM (EEPROM), flash memory, and/or the like, or any combination of these. Volatile memory 3540 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 3516, which are in communication with processor unit 3504 through system bus 3502. In these illustrative examples, the instructions are in a functional form in persistent storage 3508. These instructions may be loaded into memory 3506 for execution by processor unit 3504. Processes of one or more embodiments of the present disclosure may be performed by processor unit 3504 using computer-implemented instructions, which may be located in a memory, such as memory 3506.

These instructions are referred to as program instructions, program code, computer usable program code, or computer-readable program code executed by a processor in processor unit 3504. The program code in the different embodiments may be embodied on different physical or computer-readable storage media, such as memory 3506 or persistent storage 3508. Program code 3518 may be located in a functional form on computer-readable media 3520 that is selectively removable and may be loaded onto or transferred to data processing system 3500 for execution by processor unit 3504. Program code 3518 and computer-readable media 3520 form computer program product 3522 in these examples. In one example, computer-readable media 3520 may comprise computer-readable storage media 3524 or computer-readable signal media 3526.

Computer-readable storage media 3524 may include, for example, an optical or magnetic disk that is inserted or placed into a drive or other device that is part of persistent storage 3508 for transfer onto a storage device, such as a hard drive, that is part of persistent storage 3508. Computer-readable storage media 3524 also may take the form of a persistent storage, such as a hard drive, a thumb drive, or a flash memory, that is connected to data processing system 3500. In some instances, computer-readable storage media 3524 may not be removable from data processing system 3500.

In these examples, computer-readable storage media 3524 is a non-transitory, physical or tangible storage device used to store program code 3518 rather than a medium that propagates or transmits program code 3518. Computer-readable storage media 3524 is also referred to as a computer-readable tangible storage device or a computer-readable physical storage device. In other words, computer-readable storage media 3524 is media that can be touched by a person.

Alternatively, program code 3518 may be transferred to data processing system 3500, e.g., remotely over a network, using computer-readable signal media 3526. Computer-readable signal media 3526 may be, for example, a propagated data signal containing program code 3518. For example, computer-readable signal media 3526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 3518 may be downloaded over a network to persistent storage 3508 from another device or data processing system through computer-readable signal media 3526 for use within data processing system 3500. For instance, program code stored in a computer-readable storage medium in a server data processing system may be downloaded over a network from the server to data processing system 3500. The computer providing program code 3518 may be a server computer, a client computer, or some other device capable of storing and transmitting program code 3518.

In some examples, program code 3518 may comprise an operating system (OS) 3550. Operating system 3550, which may be stored on persistent storage 3508, controls and allocates resources of data processing system 3500. One or more applications 3552 take advantage of the operating system's management of resources via program modules 3554, and program data 3556 stored on storage devices 3516. OS 3550 may include any suitable software system configured to manage and expose hardware resources of computer 3500 for sharing and use by applications 3552. In some examples, OS 3550 provides application programming interfaces (APIs) that facilitate connection of different type of hardware and/or provide applications 3552 access to hardware and OS services. In some examples, certain applications 3552 may provide further services for use by other applications 3552, e.g., as is the case with so-called "middleware." Aspects of present disclosure may be implemented with respect to various operating systems or combinations of operating systems.

The different components illustrated for data processing system 3500 are not meant to provide architectural limitations to the manner in which different embodiments may be implemented. One or more embodiments of the present disclosure may be implemented in a data processing system that includes fewer components or includes components in addition to and/or in place of those illustrated for computer 3500. Other components shown in FIG. 38 can be varied from the examples depicted. Different embodiments may be implemented using any hardware device or system capable of running program code. As one example, data processing system 3500 may include organic components integrated with inorganic components and/or may be comprised entirely of organic components (excluding a human being). For example, a storage device may be comprised of an organic semiconductor.

In some examples, processor unit 3504 may take the form of a hardware unit having hardware circuits that are specifically manufactured or configured for a particular use, or to produce a particular outcome or progress. This type of hardware may perform operations without needing program code 3518 to be loaded into a memory from a storage device to be configured to perform the operations. For example, processor unit 3504 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 3518) may be implemented as hardware, e.g., by specifying an FPGA configuration using a hardware description language (HDL) and then using a resulting binary file to (re)configure the FPGA.

In another example, data processing system 3500 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 3504 may be implemented using a combination of processors found in computers and hardware units. Processor unit 3504 may have a number of hardware units and a number of processors that are configured to run program code 3518. With this depicted example, some of the processes may be implemented in the number of hardware units, while other processes may be implemented in the number of processors.

In another example, system bus 3502 may comprise one or more buses, such as a system bus or an input/output bus. Of course, the bus system may be implemented using any suitable type of architecture that provides for a transfer of data between different components or devices attached to the bus system. System bus 3502 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 3510 may include a number of devices that transmit data, receive data, or both transmit and receive data. Communications unit 3510 may be, for example, a modem or a network adapter, two network adapters, or some combination thereof. Further, a memory may be, for example, memory 3506, or a cache, such as that found in an interface and memory controller hub that may be present in system bus 3502.

Advantages, Features, and Benefits

The different embodiments and examples of the vehicles described herein provide several advantages over known systems. For example, illustrative embodiments and examples described herein allow a tilting vehicle to be transformed between a manned mode and an autonomous, tilt-locked mode.

Additionally, and among other benefits, illustrative embodiments and examples described herein allow for sensing orientation-dependent information using a tilt-compensated sensor.

Additionally, and among other benefits, illustrative embodiments and examples described herein allow vehicle features suitable for a vehicle of a ride-sharing service.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A convertible, tilting vehicle, comprising:
a pair of front wheels coupled to a tiltable chassis by a first mechanical linkage, wherein the pair of front wheels and the chassis are configured to tilt in unison with respect to a roll axis of the chassis;
a single rear wheel coupled to the chassis;
a motor coupled to the rear wheel and configured to drive the rear wheel to propel the vehicle;
a tilt actuator operatively coupled to the chassis and configured to selectively tilt the chassis;
a controller including processing logic configured to selectively control the tilt actuator to automatically maintain a net force vector applied to the chassis in alignment with a median plane of the chassis, wherein the net force vector is determined by gravity in combination with any applicable centrifugal force applied to the chassis; and
a rider support platform transitionable between:
(a) a first mode, in which the rider support platform is configured to support a rider thereon and to steer the vehicle in response to rider input, and
(b) a second mode, in which a portion of the rider support platform is displaced to a rider-unusable position;
wherein, in automatic response to a transition from the first mode to the second mode, the controller is configured to steer the vehicle autonomously.

2. The vehicle of claim 1, further comprising a tilt-lock mechanism configured to selectively wedge the chassis into an upright orientation.

3. The vehicle of claim 2, wherein the vehicle is configured to automatically engage the tilt-lock mechanism when the rider support platform is in the second mode.

4. The vehicle of claim 3, wherein the tilt-lock mechanism comprises a pivotable bracket coupled to the portion of the rider support platform by a second mechanical linkage configured to pivot the bracket into a tilt-locking orientation when the portion of the rider support platform is displaced.

5. The vehicle of claim 1, wherein the portion of the rider support platform comprises a handlebar assembly configured to pivot selectively about a pitch axis.

6. The vehicle of claim 1, wherein the portion of the rider support platform comprises a pivotable seat configured to pivot selectively about a pitch axis.

7. The vehicle of claim 1, further comprising:
a steering actuator operatively coupled to the pair of front wheels by a steering linkage, and configured to selectively steer the front wheels.

8. The vehicle of claim 7, wherein the steering actuator is coupled to a handlebar of the rider support platform.

9. The vehicle of claim 1, further comprising a cargo compartment coupled to the chassis.

10. The vehicle of claim 1, wherein the first mechanical linkage comprises a four-bar linkage coupled to the tilt actuator.

11. A three-wheeled vehicle, comprising:
a pair of front wheels coupled to a tiltable chassis by a tilt linkage, such that the pair of front wheels and the chassis are configured to tilt in unison with respect to a roll axis of the chassis;
a single rear wheel coupled to the chassis, the rear wheel comprising a hub motor configured to drive the rear wheel to propel the vehicle;
an orientation sensor configured to detect directional information regarding a net force vector applied to the chassis;
a tilt actuator operatively coupled to the chassis and configured to selectively tilt the chassis;
a controller including processing logic configured to selectively control the tilt actuator based on the directional information from the orientation sensor to automatically maintain the net force vector in alignment with a median plane of the chassis; and
a rider support platform having a handlebar assembly and a seat, wherein the rider support platform is configured to transition between:
(a) a first mode, in which the rider support platform is configured to support a rider thereon and to steer the vehicle in response to rider input, and
(b) a second mode, in which the handlebar assembly is pivoted rearward toward the seat such that a rider is prevented from mounting the vehicle;
wherein, in automatic response to a transition from the first mode to the second mode, the controller is configured to steer the vehicle autonomously.

12. The vehicle of claim 11, further comprising a tilt-lock mechanism configured to selectively wedge the chassis into an upright orientation.

13. The vehicle of claim 12, wherein the vehicle is configured to automatically engage the tilt-lock mechanism when the rider support platform is in the second mode.

14. The vehicle of claim 13, wherein the tilt-lock mechanism comprises a pivotable bracket coupled to the handlebar assembly by a mechanical linkage configured to pivot the bracket into a tilt-locking orientation when the handlebar assembly is pivoted rearward.

15. The vehicle of claim 11, further comprising:
a steering actuator operatively coupled to the pair of front wheels by a steering linkage, and configured to selectively steer the front wheels.

16. The vehicle of claim 15, wherein the steering actuator is coupled to the handlebar assembly.

17. The vehicle of claim 11, further comprising a cargo compartment coupled to the chassis.

18. The vehicle of claim 11, wherein the tilt linkage comprises a four-bar linkage coupled to the tilt actuator.

19. The vehicle of claim 11, wherein the controller is coupled to a wireless receiver and wherein, in the second mode, the controller is configured to receive a remote control input.

20. The vehicle of claim 11, further comprising at least one battery mounted inside an outer housing of the chassis, wherein the at least one battery is electrically coupled to the tilt actuator.

\* \* \* \* \*